United States Patent [19]
Yasunobu et al.

[11] Patent Number: 5,006,998
[45] Date of Patent: Apr. 9, 1991

[54] COMPUTER SYSTEM WITH EASY INPUT MEANS FOR CONSULTATION

[75] Inventors: Chizuko Yasunobu; Fumihiko Mori, both of Yokohama; Hideo Ohata, Machida; Mari Udagawa, Nagareyama; Keiichiro Inaba, Musashino; Kenichi Hida, Kashiwa; Yumiko Satoh, Kawasaki, all of Japan

[73] Assignee: Hitachi, Ltd., Tokyo, Japan

[21] Appl. No.: 266,401

[22] Filed: Nov. 2, 1988

[30] Foreign Application Priority Data

Nov. 5, 1987 [JP] Japan .................................. 62-279877
Nov. 14, 1987 [JP] Japan .................................. 62-286439

[51] Int. Cl.$^5$ ........................ G06F 15/20; G06F 7/28
[52] U.S. Cl. ..................................... 364/513; 364/408
[58] Field of Search ................. 364/513, 300, 401, 408

[56] References Cited

U.S. PATENT DOCUMENTS

| | | | |
|---|---|---|---|
| 4,697,243 | 9/1987 | Moore et al. | 364/513 |
| 4,704,695 | 11/1987 | Kimura et al. | 364/513 |
| 4,803,642 | 2/1988 | Muranaga | 364/513 |

OTHER PUBLICATIONS

Expert Systems: The Structure, History, and Future of Successful AI Applications; IEEE Potentials; Ann Miller; Oct. 1986.
Personal Finance Adviser Using Eshell by Monzen material of The 3rd Artificial Knowledge Promotion Committee, Application System No. 2 Expert Committee (1986).
"LISP" Patric Henry Winston, et al.; pp. 245-249; Addison Wesley.

*Primary Examiner*—Allen MacDonald
*Attorney, Agent, or Firm*—Fay, Sharpe, Beall, Fagan, Minnich & McKee

[57] ABSTRACT

The present invention discloses a consultation system which stores the intention of a client, processing know-how of consultation and progress status of consultation in addition to an expertise of the field of consultation, the status of client and reply, and accomplishes the flow of consultation in accordance with the intention and reaction of the client. Thus, the client can ask advices or expert's opinion in accordance with his desire.

21 Claims, 39 Drawing Sheets

FIG. 3

| INTENTION AREA | | | 125 |
|---|---|---|---|
| (CONSULTING PARTY | PURPOSE | PREPARATIONS FOR INHERITANCE IN THE FUTURE | 300 |
| | TIME | 120 MIN | |
| | KNOWLEDGE OF INHERITANCE TAX | ORDINARY | |
| | OPERATION | INSUFFICIENT) | |

| SITUATION AREA | 320 | | 330 | | 130 |
|---|---|---|---|---|---|
| (PERSON2 | CLASS | HEIR APPARENT | (PROPERTY1 | CLASS | LAND FOR HOUSING |
| | RELATION WITH ANCESTOR | SPOUSE | | AREAGE | 300m² |
| | AGE | ADULT | | MARKET PRICE | ¥28,600,000 |
| | HANDICAP | HEALTHY | | EVALUATED PRICE | ¥14,300,000 |
| | LEGAL INHERI- TANCE RATIO | 1/2 | | ESTIMATION METHOD | 50% |
| | | | | TAXABLE AMOUNT | ¥10,000,000 |
| | LEGAL PORTION OF HEIR | 1/4) | | EVALUATION METHOD | SMALL-SCALE HOUSING LAND) |

| REPLY AREA | | 340 | 135 |
|---|---|---|---|
| (REPLY CONDITION | GIVEN ADVICE | | |
| | {DECISION OF LEGAL HEIRS, INPUT OF PROPERTY, EVELUATION, NEGLECTED PROPERTY ITEMS, PROPERTY TO BE DONATED, DONEES, UTILIZATION OF SPOUSE'S DEDUCTION OF DONATION TAX, TRUST FOR SPECIAL HANDICAPPED} | | |
| | PRESENT PLAN | PLAN2) | |
| (LIFETIME DONA- TION PLAN3 | CLASS | LIFETIME DONATION PLAN | 350 |
| | PLAN | PLAN2 | |
| | DEDUCTION, ETC | SPECIAL HANDICAPPED | |
| | PROPERTY TO BE DONATED | PROPERTY4 | |
| | DONEES | 3 | |
| | DONATED AMOUNT | ¥30,000,000 | |
| | DONATION TAX | 0) | |

| PROGRESS STATUS AREA | | | 140 |
|---|---|---|---|
| (PROGRESS STATUS | SUBJECT | LIFETIME DONATION | 360 |
| | ADVICE | HOUSE ACQUISITION FOUND | |
| | PASSING TIME | 20 MIN | |
| | REMAINING TIME | 100 MIN) | |

| STORE PLAN AREA | | | 145 |
|---|---|---|---|
| (STORE PLAN | SUBSTITUTE PLAN | {PLAN1}) | 380 |

FIG. 4

```
META-RULE (START META-RULE
IF      START
THEN    (RULE GROUP    GRASP OF INTENTION    PRIORITY  100)
)                                                                    400

(META-RULE OF FUTURE INHERITANCE MEASURES
IF      FUTURE INHERITANCE MEASURES
THEN    (RULE GROUP    DECISION OF LEGAL HEIRS    PRIORITY  80)
        (RULE GROUP    EVALUATION OF PROPERTY     PRIORITY  70)
        (RULE GROUP    CALCULATION OF INHERI-
                       TANCE TAX                  PRIORITY  60)
        (RULE GROUP    SUCCESSION OF BUSINESS     PRIORITY  50)
        (RULE GROUP    LIFETIME DONATION          PRIORITY  40)
        (RULE GROUP    PROPERTY CONSTITUTION      PRIORITY  30)
        (RULE GROUP    PARTITION OF THE
                       INHERITANCE                PRIORITY  20)
        (RULE GROUP    MANAGEMENT OF PROPERTY     PRIORITY  10)
)                                                                    440
```

FIG. 5

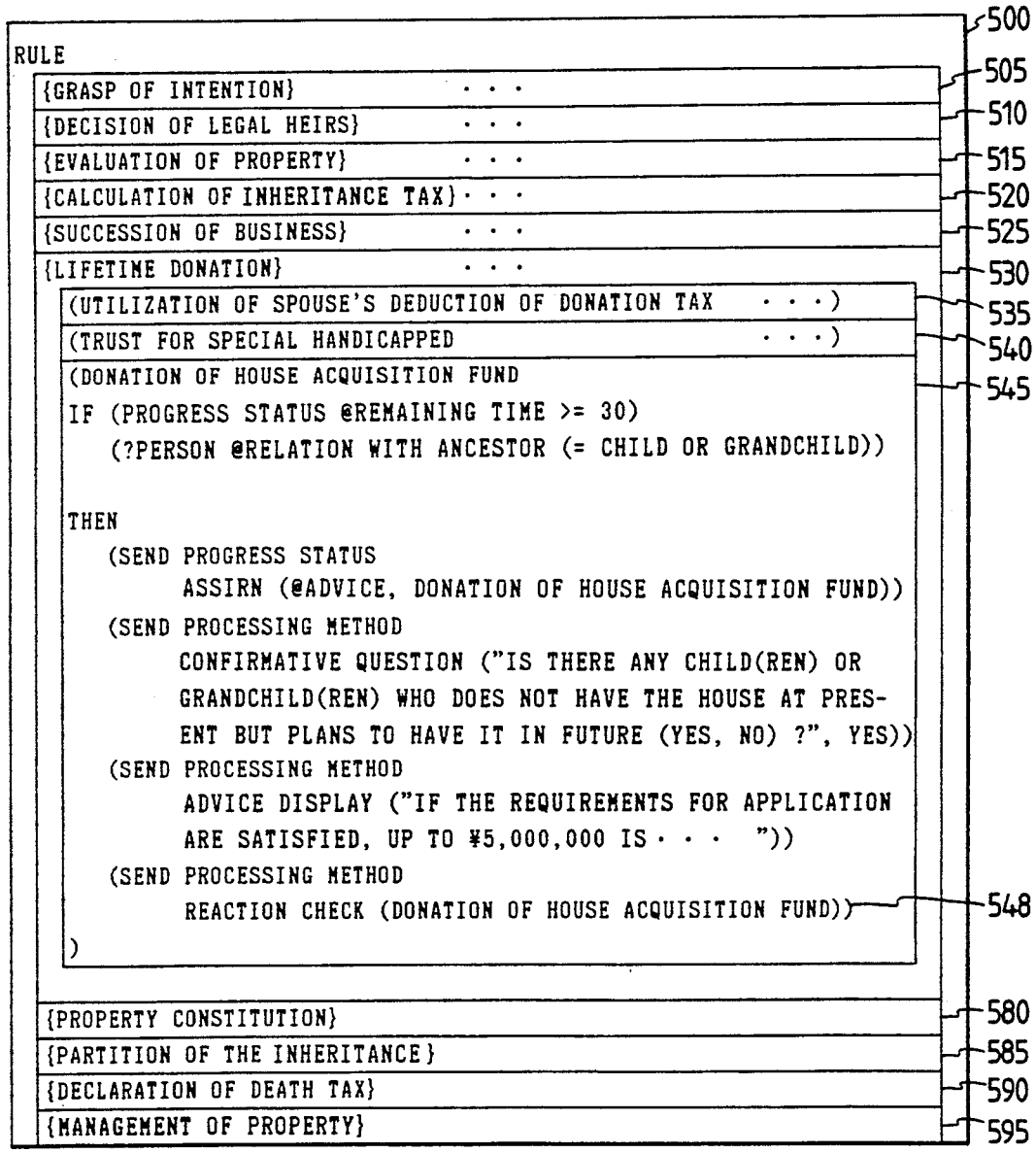

```
RULE                                                              ┌500
  {GRASP OF INTENTION}              ...                           ┌505
  {DECISION OF LEGAL HEIRS}         ...                           ┌510
  {EVALUATION OF PROPERTY}          ...                           ┌515
  {CALCULATION OF INHERITANCE TAX}  ...                           ┌520
  {SUCCESSION OF BUSINESS}          ...                           ┌525
  {LIFETIME DONATION}               ...                           ┌530
    (UTILIZATION OF SPOUSE'S DEDUCTION OF DONATION TAX   ...)     ┌535
    (TRUST FOR SPECIAL HANDICAPPED                       ...)     ┌540
    (DONATION OF HOUSE ACQUISITION FUND                           ┌545
     IF (PROGRESS STATUS @REMAINING TIME >= 30)
        (?PERSON @RELATION WITH ANCESTOR (= CHILD OR GRANDCHILD))

THEN
        (SEND PROGRESS STATUS
              ASSIRN (@ADVICE, DONATION OF HOUSE ACQUISITION FUND))
        (SEND PROCESSING METHOD
              CONFIRMATIVE QUESTION ("IS THERE ANY CHILD(REN) OR
              GRANDCHILD(REN) WHO DOES NOT HAVE THE HOUSE AT PRES-
              ENT BUT PLANS TO HAVE IT IN FUTURE (YES, NO) ?", YES))
        (SEND PROCESSING METHOD
              ADVICE DISPLAY ("IF THE REQUIREMENTS FOR APPLICATION
              ARE SATISFIED, UP TO ¥5,000,000 IS · · · "))
        (SEND PROCESSING METHOD
              REACTION CHECK (DONATION OF HOUSE ACQUISITION FUND)) ┌548
    )

{PROPERTY CONSTITUTION}                                         ┌580
  {PARTITION OF THE INHERITANCE}                                  ┌585
  {DECLARATION OF DEATH TAX}                                      ┌590
  {MANAGEMENT OF PROPERTY}                                        ┌595
```

FIG. 8

| | |
|---|---|
| PROCEDURE OF CONFIRMATIVE QUESTION | 805 |
| PROCEDURE OF PRESENTING ADVICE | 810 |
| PROCEDURE OF CHECKING | 815 |
| PROCEDURE OF TRERM EXPLANATION | 820 |
| PROCEDURE OF DETAILED EXPLANATION | 825 |
| PROCEDURE OF EXAMPLE PRESENTATION | 830 |
| PROCEDURE OF STORE | 835 |
| PROCEDURE OF FETCH | 840 |
| PROCEDURE OF PRINT | 845 |
| PROCEDURE OF REGISTER | 850 |
| PROCEDURE OF READ REGISTERED CONTENT | 855 |
| PROCEDURE OF SEND OUT A QUESTIONNAIRE | 860 |
| PROCEDURE OF DATA COLLECTION | 865 |
| . . . . . | |

FIG. 9

| | |
|---|---|
| (ADVERTISEMENT   DONATION OF HOUSE ACQUISITION FUND . . . ) | "USE XX BANK'S HOUSING LOAN FOR INSUFFICIENT FUND" |

| NUMBER OF SENTENCES | 4 | SELECTED SENTENCES | 1 |
|---|---|---|---|

| SENTENCE NO. | ELEMENT NO. | CLASSIFI-CATION | VALUE TYPE OR NUMBER | VALUE OR RANGE OF VALUE | DETER-MINED VALUE |
|---|---|---|---|---|---|
| 1 | 1 | FIXED | | "THE ANCESTOR HAVE THE SPOUSE ?" | |
| 1 | 2 | SELECTION | 1 | { HAS, DOES NOT HAVE } | YES |
| 1 | 3 | FIXED | | "HEALTHY CHILDREN AND" | |
| 1 | 4 | INPUT | INTEGER | [ 0, * ) | 3 |
| 1 | 5 | FIXED | | "DEAD CHILD" | |
| 1 | 6 | INPUT | INTEGER | [ 0, * ) | 0 |
| 1 | 7 | FIXED | | " HAS " | |
| 2 | 1 | FIXED | | "THE ANCESTOR DOES NOT HAVE NAY CHILD···" | |
| | | | | ··· | |

INHERITANCE CONSULTATION EXPERT SYSTEM
XX BANK

1502

| PLEASE GIVE ADVICE ON INHERITANCE BECAUSE ___ IS DEAD. |
| PLEASE GIVE ADVICE ON FUTURE INHERITANCE. |
| PLEASE GIVE ADVICE ON LIFETIME DONATION OF PROPERTY. |
| PLEASE GIVE ADVICE ON THE PROPERTY WHICH WILL BE OBJECT OF THE INHERITANCE TAX. |
| PLEASE GIVE ADVICE ON WHO INERITS. |
| PLEASE GIVE CONTINUOUS ADVICE BECAUSE THE CONTENT OF CONSULTATION IS REGISTERED. |

1504

I HAVE | SUFFICIENT IDEA / ORDINARY IDEA / NO IDEA AT ALL | ON THE INHERITANCE TAX AND | WOULD LIKE TO USE / HAVE ALREADY USED |

| FOR THE FIRST TIME | THIS SYSTEM FOR | THREE / TWO / ONE | HOURS.

1506

THE AGE OF THE ANCESTOR IS [65] AND HIS (HER) OCCUPATION IS

| EXECUTIVE |
| COMPANY EMPLOYEE, PUBLIC SERVANT |
| SELF-MANAGEMENT |
| FARMER |
| OWNER OF RENTAL HOUSES |
| OTHERS |

I WOULD LIKE TO HAVE ADVICE ON THE INHERITANCE MEASURES FOR COMING [5] YEARS.
10
15
20

FAMILY STATUS OF THE ANCESTOR IS AS FOLLOWS                                    1602

| THE ANCESTOR | HAS | , 3 HEALTHY CHILDREN AND | 0 | DEAD CHILD. |
|              | DOES NOT HAVE | | | |

THE ANCESTOR DOES NOT HAVE ANY CHILD BUT | HAS | THE SPOUSE
                                          | DOES NOT HAVE |

AND | BOTH PARENTS | ARE FINE.
    | ONLY ONE OF THE PARENT |
    | BOTH PARENT ARE DEAD BUT GRANDPARENT |

THE ANCESTOR DOES NOT HAVE ANY CHILD AND PARENT, BUT | HAS |
                                                     | DO NOT HAVE |

THE SPOUSE AND ☐ HEALTHY BROTHERS (SISTERS) AND ☐ DEAD BROTHERS (SISTERS).

THE ANCESTOR DOES NOT AT ALL HAVE ANY SPOUSE, LINEAL ASCENDANTS (CHILDREN AND GRANDCHILDREN), LINEAL DESCENDANTS (PARENTS AND GRANDPARENTS), BROTHERS AND SISTERS AND NEPHEWS AND NIECES.

AMONG THE CHILDREN, FILIATION IS 0 .

[ADVICE]  THE LEGAL HEIRS ARE FOUR, i.e. SPOUSE, CHILD 1, CHILD 2 AND
          CHILD 3. THE LEGAL INHERITANCE RATIO AND THE LEGAL PROPOR-
          TION OF HEIRS ARE AS FOLLOWS.

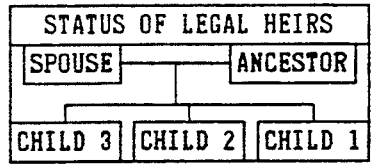

STATUS OF LEGAL HEIRS

| LEGAL INHERITANCE | | | | | |
|---|---|---|---|---|---|
| LEGAL HEIRS | TOTAL | SPOUSE | CHILD1 | CHILD2 | CHILD3 |
| LEGAL INHERITANCE RATIO | 1 | 1/2 | 1/6 | 1/6 | 1/6 |
| LEGAL PORTION OF HEIR | 1/2 | 1/4 | 1/12 | 1/12 | 1/12 |

| NEXT |
|---|
| MORE DETAILED INFORMATION IS REQUIRED |
| EXPLAIN MEANING OF TERMS |
| OTHERS |

THE ANCESTOR HAS THE FOLLOWING PROPERTIES. 1702

| LAND FOR DWELLING | HOUSE FOR DWELLING | DEATH RETIREMENT ALLOWANCE & CONDOLENCE MONEY |
|---|---|---|
| LAND FOR BUSINESS | HOUSE FOR BUSINESS | LIVING TREES |
| OTHER LAND FOR HIS OWN USE | HOUSE FOR RENT | ORDINARY CAR |
| LAND FOR RENT | OTHER HOUSES & BUILDINGS | HOME PROPERTIES |
| LAND FOR RENT WITH HOUSE FOR RENT | BUSINESS PROPERTIES | GOLF MEMBERSHIP |
| LEASE, ETC | STOCKS OF SPECIFIED FAMILY PARTENERSHIP | RIGHT FOR INSURANCE |
| FARMLAND (RICE FIELD & FIELD) | LISTED STOCKS & BONDS | LOAN |
| MOUNTAINS & FORESTS | CASH, DEPOSITS & SAVINGS | RESERVE FUND FOR STOCK HOLDING GROUP |
| OTHER LANDS | LIFE INSURANCE | OTHER PROPERTIES |

THE ANCESTOR HAS THE FOLLOWING DEBT.

| DEBT |
|---|

[ADVICE] THE HERITABLE PROPERTY INCLUDES THE FOLLOWING IN ADDITION
TO THOSE LISTED ABOVE.
PROPERTY: TELEPHONE LIGHT,
ACCOUNT RECEIVABLE (SALARY, RENT, ETC)
REFUNDMENT TAX
LOAN: FUNEL EXPENSES
UNPAID MONEY (UNPAID TAX, UNPAID HEALTH INSURANCE,
UNPAID LIGHT-HEAT EXPENSES, UNPAID MEDICAL EXPENSES,
CREDIT CARD, ETC)

| NEXT |
|---|
| MORE DETAILED INFORMATION IS REQUIRED |
| EXPLAIN MEANING OF TERMS |
| OTHERS |

EACH OF THE PROPERTIES IS AS FOLLOWS.                              1802
  LAND FOR DWELLING    MARKET PRICE    ¥ 28,600,000   AREAGE  300 m²
                       ASSESSED VALUE
  HOUSE FOR DWELLING   ASSESSED VALUE OF FIXED PROPERTY TAX   ¥ 12,000,000
                       ASSESSED MARKET PRICE
  CASH, DEPOSITS & SAVINGS      ¥ 50,000,000
  LISTED STOCKS & BONDS         ¥ 30,000,000
  GOLF MEMBERSHIP      MARKET PRICE    ¥ 10,000,000
                       ASSESSED VALUE
  LIFE INSURANCE       INSURANCE AMOUNT ¥ 50,000,000   BENEFICIARIES   SPOUSE
                                                                       CHILD1
                                                                       CHILD2
                                                                       CHILD3
                                                                       OTHERS

[ADVICE] THE TAXABLE AMOUNT AND EVALUATION METHOD OF EACH PROPERTY ARE AS PER ATTACHED TABLE. THE DIFFERENCE OBTAINED BY SUBTRACTING FROM THE TOTAL OF THE TAXABLE AMOUNT THE BASIC DEDUCTION OF THE INHERITANCE TAX, i.e. [¥20,000,000 + (4,000,000 x NUMBER OF LEGAL HEIRS)], IS THE OBJECT OF TAXATION.

| LIST OF PROPERTIES | | |
|---|---|---|
| | ASSESSED VALUE | METHOD OF ASSESSMENT |
| LAND FOR DWELLING | 10,000 | 50% OF MARKET PRICE (ESTIMATION), 30% DEDUCTION (SMALL-SCALE LAND ASSESSMENT DEDUCTION) |
| HOUSE FOR DWELLING | 6,000 | 50% OF ASSESSED VALUE OF FIXED PROPERTY TAX (ESTIMATION) |
| CASH, DEPOSITS & SAVINGS | 50,000 | |
| LISTED STOCKS, BONDS, ETC | 30,000 | |
| GOLF MEMBERSHIP | 7,000 | 70% OF MARKET PRICE |
| LIFE INSURANCE | 40,000 | DEDUCTION BY ¥25,000,000 x 4 HEIRS |
| TOTAL | 143,000 | |

| NEXT |
|---|
| MORE DETAILED INFORMATION IS REQUIRED |
| EXPLAIN MEANING OF TERMS |
| OTHERS |

| THE SPOUSE | IS A MINOR OR HANDICAPPED. ~1902
|---|
| CHILD 1 |
| CHILD 2 |
| CHILD 3 |

THE CHILD 2 IS | A HEALTHY MINOR | AND IS |36| YEARS OLD.
               | A HANDICAPPED |
               | A SPECIFIC HANDICAPPED |

[ADVICE]   IF INHERITANCE IS MADE WITH THE PRESENT FAMILY AND THE PRESENT PROPERTIES IN ACCODANCE WITH THE LEGAL INHERITANCE PROPORTION, THE INHERITANCE TAX OF ¥12,600,000 MUST BE PAID. THIS TOTAL AMOUNT DOES NOT CHANGE OR IS NOT REDUCED EVEN IF METHOD OF PARTITIONIS CHANGED.

INHERITANCE TAX AMOUNT

| LEGAL HEIRS | TOTAL | SPOUSE | CHILD 1 | CHILD 2 | CHILD 3 |
|---|---|---|---|---|---|
| LEGAL PROPORTION | 1 | 1/2 | 1/6 | 1/6 | 1/6 |
| DEDUCTION AVAILABLE | | SPOUSE | | A SPECIFIC HANDICAPPED | |
| LEGAL INHERITANCE AMOUNT | 143,000 | 71,500 | 23,830 | 23,830 | 23,830 |
| CALCULATED TAX AMOUNT | 28,720 | 14,360 | 4,780 | 4,780 | 4,780 |
| DEDUCTION | | 14,360 | 0 | 1,740 | 0 |
| AMOUNT OF PAYMENT | 12,600 | 0 | 4,780 | 3,040 | 4,780 |

| NEXT |
|---|
| MORE DETAILED INFORMATION IS REQUIRED |
| EXPLAIN MEANING OF TERMS |
| OTHERS |

[ADVICE] TO REDUCE THE INHERITANCE PROPERTY, IT IS EFFECTIVE TO MAKE LIFETIME DONATION BY UTILIZING THE DEDUCTION OF THE DONATION TAX. IN SUCH A CASE, PRIORTY OF DONATION IS GIVEN TO THE FOLLOWING PROPERTIES.
* RESTRICTIVE PROPERTIES WHICH CANNOT BE TRANSFERRED EASILY TO OTHERS
* PROPERTIES WHOSE PRICES ARE EXPECTED TO RISE IN FUTURE
* PROPERTIES WHICH ARE ASSESSED AT VALUES LOWER THAN MARKET PRICES

| NEXT |
| --- |
| MORE DETAILED INFORMATION IS REQUIRED |
| EXPLAIN MEANING OF TERMS |
| NO INTEREST IN LIFETIME DONATION |
| OTHERS |

[ADVICE] DONATION SHALL BE MADE TO A GREATER NUMBER OF PEOPLE WHEN MAKING LIFETIME DONATION. PARTICULARLY, DONATIONTO GRANDCHILD(REN) IS EFFECTIVE BECAUSE IT SKIPS ONCE THE PAYMENT OF THE INHERITANCE TAX.

| NEXT |
|---|
| I'D LIKE TO SELECT THIS MEASURE |
| MORE DETAILED INFORMATION IS REQUIRED |
| EXPLAIN MEANING OF TERMS |
| OTHERS |

I'D LIKE TO CONSIDER LIFETIME DONATION TO THE FOLLOWING PEOPLE.

| CHILD(REN) OF CHILD 1 | SPOUSE OF CHILD 1 | FATHER | OTHERS |
|---|---|---|---|
| CHILD(REN) OF CHILD 2 | SPOUSE OF CHILD 2 | MOTHER | |
| CHILD(REN) OF CHILD 3 | SPOUSE OF CHILD 3 | BROTHER(S) SISTER(S) | |

STATUS OF HEIRS

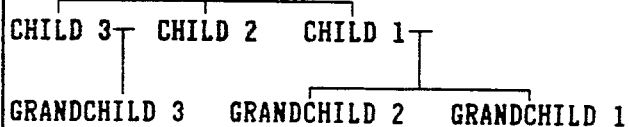

| NEXT |
|---|
| I'D LIKE TO SELSCT THIS MEASURE |
| MORE DETAILED INFORMATION IS REQUIRED |
| EXPLAIN MEANING OF TERMS |
| OTHERS |

THE TERM OF MARRIAGE WITH THE SPOUSE IS [MORE THAN / LESS THAN] 20 YEARS.

[ADVICE] IF A PREDETERMINED CONDITION IS SATISFIED, A REAL ESTATE FOR DWELLING OR A FUND FOR ACQUIRING THE REAL ESTATE FOR DWELLING WITHIN ¥10,000,000 (BESIDES THE BASIC DEDUCTION AMOUNT OF ¥600,000) IS DONATED. DECLARATION TO THE TAX OFFICE IS NECESSARY BUT NO TAX IS IMPOSED.

| NEXT |
|---|
| I'D LIKE TO SELECT THIS MEASURE |
| I'D LIKE TO EXAMINE AN EXAMPLE |
| MORE DETAILED INFORMATION IS REQUIRED |
| EXPLAIN MEANING OF TERMS |
| OTHERS |

2204

| EXAMPLE OF SPOUSE'S DEDUCTION OF DONATION TAX | | |
|---|---|---|
| | PROPERTY (ASSESSED AMOUNT) | DONATION TO SPOUSE |
| LAND FOR DWELLING | ¥20,000,000 | ¥8,000,000 |
| HOUSE FOR DWELLING | ¥6,000,000 | ¥2,400,000 |
| 40% OF SHARE OF EACH OF THE LAND AND HOUSE FOR DWELLING CORRESPONDING TO (¥10,400,000) CAN BE DONATED TAX-FREE TO THE SPOUSE. | | |

| NO INTEREST |
|---|
| I'D LIKE TO SELECT THIS MEASURE |
| I'D LIKE TO EXAMINE EXAMPLE |
| MORE DETAILED INFORMATION IS REQUIRED |
| EXPLAIN MEANING OF TERMS |
| OTHERS |

¥ [6,000,000] OF THE LAND FOR DWELLING AND ¥ [3,600,000] OF THE HOUSE FOR DWELLING ARE DONATED TO THE SPOUSE.

| LIFETIME DONATION PLAN | | | | | | | | | | | | |
|---|---|---|---|---|---|---|---|---|---|---|---|---|
| DEDUCTION AVAILABLE | DONATED PROPERTY | SPOUSE | CHILD 1 | CHILD 2 | CHILD 3 | GRANDCHILD 1 | GRANDCHILD 2 | GRANDCHILD 3 | AMOUNT RECEIVED BY MAN/YEAR | DONATION AMOUNT | DONATION TAX AMOUNT | DECLARATION |
| SPOUSE'S DEDUCTION | LAND FOR DWELLING | ○ | | | | | | | | 6,000 | 0 | NECESSARY |
| SPOUSE'S DEDUCTION | HOUSE FOR DWELLING | ○ | | | | | | | | 3,600 | 0 | NECESSARY |

[ADVICE] TRUST BENEFICIARY RIGHT IS DONATED TO SPECIAL HANDICAPPED. TAX IS FREE UP TO ¥30,000,000.

| NO INTEREST |
| --- |
| I'D LIKE TO SELECT THIS MEASURE |
| I'D LIKE TO EXAMINE EXAMPLE |
| MORE DETAILED INFORMATION IS REQUIRED |
| EXPLAIN MEANING OF TERMS |
| OTHERS |

¥ 30,000,000 OF LISTED STOCKS, BONDS, ETC IS DONATED TO CHILD 2.
CASH, DEPOSITS & SAVINGS

| LIFETIME DONATION PLAN | | | | | | | | | | | |
| --- | --- | --- | --- | --- | --- | --- | --- | --- | --- | --- | --- |
| DEDUCTION AVAILABLE | DONATED PROPERTY | SPOUSE | CHILD 1 | CHILD 2 | CHILD 3 | GRANDCHILD 1 | GRANDCHILD 2 | GRANDCHILD 3 | AMOUNT RECEIVED BY MAN/ YEAR | DONATION AMOUNT | DONATION TAX AMOUNT | DECLA-RATION |
| SPOUSE'S DEDUCTION | LAND FOR DWELLING | ○ | | | | | | | | 6,000 | 0 | NECES-SARY |
| SPOUSE'S DEDUCTION | HOUSE FOR DWELLING | ○ | | | | | | | | 3,600 | 0 | NECES-SARY |
| SPECIAL HANDI-CAPPED | LISTED STOCKS & BONDS | | | ○ | | | | | 30,000 | 30,000 | 0 | NECES-SARY |

IS THERE ANY CHILD(REN) OR GRANDCHILD(REN) WHO DOES NOT HAVE THE HOUSE AT PRESENT BUT PLANS TO HAVE IT IN FUTURE [YES] ? — 2402
[NO]
2403

[ADVICE]  IF THE REQUIREMENTS FOR APPLICATION ARE SATISFIED, UP TO ¥5,000,000 IS DONATED AS THE HOUSE ACQUISITION FUND TO THE CHILD OR GRANDCHILD. IF ¥5,000,000 IS DONATED, THE DONATION TAX IS ¥200,000 AND DONATION OF UP TO ¥3,000,000 IS TAX-FREE AND DECLARATION IS NECESSARY.

\*\*\*  USE XX BANK'S HOUSING LOAN FOR INSUFFICIENT FUND  \*\*\*

| NEXT | 2405 |
|---|---|
| I'D LIKE TO SELECT THIS MEASURE | |
| I'D LIKE TO EXAMINE EXAMPLE | |
| MORE DETAILED INFORMATION IS REQUIRED | |
| EXPLAIN MEANING OF TERMS | |
| OTHERS | |

2406

DETAILED EXPLANATION OF DONATION OF HOUSE ACQUISITION FUND DONATION
REQUIREMENT FOR APPLICATION
① ONE WHO HAS NOT BEEN LIVED IN HIS OWN OR SPOUSE'S HOUSE WITHIN FIVE YEARS BEFORE DONATION
② ONE WHOSE ANNUAL INCOME IS UP TO ¥8,000,000 IN THE YEAR OF DONATION
③ FUND FOR ACQUIRING A NEWLY BUILT HOUSE THE FLOOR AREA OF WHICH IS FROM $40m^2$ TO $180m^2$ (THE HOUSE WHICH WILL BE USED FOR ONE'S OWN DWELLING TILL MARCH 15 OF THE YEAR NEXT TO THE YEAR OF ACQUISITION OR WHICH IS EXPECTED TO BE USED RELIABLY WITHOUT ANY DELAY)
CALCULATION METHOD OF DONATION TAX
  . . . . .

| NO INTEREST |
|---|
| I'D LIKE TO SELECT THIS MEASURE |
| I'D LIKE TO EXAMINE EXAMPLE |
| MORE DETAILED INFORMATION IS REQUIRED |
| EXPLAIN MEANING OF TERMS |
| OTHERS |

2408

CASH, DEPOSITS OR SAVINGS OF ¥ [5,000,000] IS DONATED TO

| CHILD 1 |
|---|
| CHILD 2 |
| CHILD 3 |
| GRANDCHILD 1 |
| GRANDCHILD 2 |
| GRANDCHILD 3 |

[ADVICE] THE DONATION TAX IS EXEMPT IF THE TOTAL OF DONATED PROPERTY PER YEAR IS UP TO ¥600,000. UTILIZING THIS DEDUCTION, DONATION OF UP TO ¥600,000 IS MADE TO THE SPOUSE, CHILD(REN) AND GRANDCHILD(REN) OF ABOVE 15 YEARS OLD EVERY YEAR. NO DECLARATION IS NECESSARY.

| NO INTEREST |
| I'D LIKE TO SELECT THIS MEASURE |
| I'D LIKE TO EXAMINE EXAMPLE |
| MORE DETAILED INFORMATION IS REQUIRED |
| EXPLAIN MEANING OF TERMS |
| OTHERS |

DONATION OF ¥ [600,000] PER MAN/YEAR FOR [5] YEARS IS MADE TO

| SPOUSE |
| CHILD 1 |
| CHILD 2 |
| CHILD 3 |
| GRANDCHILD 1 |
| GRANDCHILD 2 |
| GRANDCHILD 3 |

2502

| LIFETIME DONATION PLAN | | | | | | | | | | | |
|---|---|---|---|---|---|---|---|---|---|---|---|
| DEDUCTION AVAILABLE | DONATED PROPERTY | SPOUSE | CHILD 1 | CHILD 2 | CHILD 3 | GRANDCHILD 1 | GRANDCHILD 2 | GRANDCHILD 3 | AMOUNT RECEIVED BY MAN/ YEAR | DONATION AMOUNT | DONATION TAX AMOUNT | DECLA-RATION |
| SPOUSE'S DEDUCTION | LAND FOR DWELLING | ○ | | | | | | | | 6,000 | 0 | NECES-SARY |
| SPOUSE'S DEDUCTION | HOUSE FOR DWELLING | ○ | | | | | | | | 3,600 | 0 | NECES-SARY |
| SPECIAL HANDI-CAPPED | LISTED STOCKS, BONDS, ETC | | | ○ | | | | | 30,000 | 30,000 | 0 | NECES-SARY |
| HOUSE ACQUISI-TION FUND | CASH, DEPOSIT & SAVING | | ○ | | | | | | 5,000 | 5,000 | 200 | NECES-SARY |
| FOR 5 YEARS | CASH, DEPOSIT & SAVING | ○ | ○ | ○ | ○ | ○ | ○ | ○ | 600 | 1,800 | 0 | NOT NECES-SARY |

FIG. 26

[ADVICE] IF THE LIFETIME DONATION DESCRIBED IS MADE, THE TAX OF ¥9,810,000 CAN BE SAVED AS LISTED BELOW.

|  | WHEN LIFETIME DONATION IS NOT MADE | WHEN LIFETIME DONATION IS MADE | BALANCE |
|---|---|---|---|
| LIFETIME DONATION AMOUNT | 0 | 62,600 |  |
| INHERITANCE AMOUNT | 143,000 | 80,400 |  |
| DONATION TAX AMOUNT | 0 | 200 |  |
| INHERITANCE TAX AMOUNT | 12,600 | 2,832 |  |
| TOTAL OF TAXES | 12,600 | 3,032 | 9,568 |

| DONATION & INHERITANCE TAX AMOUNT | | | | | | | | |
|---|---|---|---|---|---|---|---|---|
| LEGAL HEIRS | TOTAL | SPOUSE | CHILD1 | CHILD2 | CHILD3 | GRAND-CHILD1 | GRAND-CHILD2 | GRAND-CHILD3 |
| LEGAL INHERITANCE PROPORTION | 1 | 1/2 | 1/6 | 1/6 | 1/6 |  |  |  |
| DEDUCTION AVAILABLE |  | SPOUSE |  | HANDI-CAPPED |  |  |  |  |
| LIFETIME DONATION AMOUNT | 62,600 | 12,600 | 5,000 | 33,000 | 3,000 | 3,000 | 3,000 | 3,000 |
| DONATION TAX AMOUNT | 200 | 0 | 200 | 0 | 0 | 0 |  |  |
| LEGAL ACQUISITION AMOUNT | 80,400 | 40,200 | 13,400 | 13,400 | 13,400 |  |  |  |
| CALCULATED TAX AMOUNT | 8,500 | 4,250 | 1,416 | 1,416 | 1,416 |  |  |  |
| DEDUCTION AMOUNT |  | 4,250 | 0 | 1,740 | 0 |  |  |  |
| TAX TO BE PAID | 2,832 | 0 | 1,416 | 0 | 1,416 |  |  |  |

(NOTE) THE INHERITANCE DOES NOT INCLUDE THE DONATED PROPERTIES TO THE HEIRS WITHIN THREE YEARS BEFORE THE START OF SUCCESSION.

| NEXT |
|---|
| MORE DETAILED INFORMATION IS REQUIRED |
| EXPLAIN MEANING OF TERMS |
| OTHERS |

FIG. 27

[ADVICE] WHEN THE INHERITANCE IS TO BE PARTITIONED, ALLOT THE REAL ESTATE WHICH IS EXPECTED TO RISE IN PRICE IN FUTURE TO CHILD(REN) AND THE FINANCIAL ASSET TO THE SPOUSE IN VIEW OF THE INHERITANCE TAX AT THE TIME OF THE SPOUSE'S SUCCESSION. HOWEVER, IT IS SOMETIMES BETTER TO ALLOT THE REAL ESTATE WHERE THE SPOUSE LIVES TO THE SPOUSE SO THAT HE OR SHE CAN LIVE WITHOUT ANXIETY.

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTI-TIONED |
| LAND FOR DWELLING | 4,000 | | | | | | | | 4,000 |
| HOUSE FOR DWELLING | 2,400 | | | | | | | | 2,400 |
| CASH, SAVING & DEPOSIT | 27,000 | | | | | | | | 27,000 |
| LISTED STOCKS & BONDS | 0 | | | | | | | | 0 |
| GOLF MEMBERSHIP | 7,000 | | | | | | | | 7,000 |
| LIFE INSURANCE | 40,000 | | | | | | | | 40,000 |
| TOTAL | 80,400 | | | | | | | | 80,400 |

| NEXT |
|---|
| MORE DETAILED INFORMATION IS REQUIRED |
| EXPLAIN MEANING OF TERMS |
| OTHERS |

[ADVICE]  THE INSURANCE MONEY WHOSE BENEFICIARIES ARE DETERMINED IS NOT THE OBJECT OF THE INHERITANCE PARTITION.

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTI-TIONED |
| LAND FOR DWELLING | 4,000 | | | | | | | | 4,000 |
| HOUSE FOR DWELLING | 2,400 | | | | | | | | 2,400 |
| CASH, SAVING & DEPOSIT | 27,000 | | | | | | | | 27,000 |
| LISTED STOCKS & BONDS | 0 | | | | | | | | 0 |
| GOLF MEMBERSHIP | 7,000 | | | | | | | | 7,000 |
| LIFE INSURANCE | 40,000 | 40,000 | | | | | | | 0 |
| TOTAL | 80,400 | 40,000 | | | | | | | 40,400 |

| NEXT |
|---|
| MORE DETAILED INFORMATION IS REQUIRED |
| EXPLAIN MEANING OF TERMS |
| OTHERS |

[ADVICE] THE PROPERTY WHICH THE SPOUSE ACQUIRES AND WHICH IS THE GREATER ONE OF THE HALF OF THE TAXABLE AMOUNT OF THE INHERITANCE TAX AND ¥40,000,000 IS NOT SUBJECT TO TAXATION. THEREFORE, IT IS BETTER FOR THE SPOUSE TO ACQUIRE PREFERENTIALLY THE REAL ESTATE FOR DWELLING AND SAVINGS AND DEPOSITS TO THAT AMOUNT.

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTITIONED |
| LAND FOR DWELLING | 4,000 | 4,000 | | | | | | | 0 |
| HOUSE FOR DWELLING | 2,400 | 2,400 | | | | | | | 0 |
| CASH, SAVING & DEPOSIT | 27,000 | | | | | | | | 27,000 |
| LISTED STOCKS & BONDS | 0 | | | | | | | | 0 |
| GOLF MEMBERSHIP | 7,000 | | | | | | | | 7,000 |
| LIFE INSURANCE | 40,000 | 40,000 | | | | | | | 0 |
| TOTAL | 80,400 | 46,400 | | | | | | | 34,000 |

| NEXT |
|---|
| MORE DETAILED INFORMATION IS REQUIRED |
| EXPLAIN MEANING OF TERMS |
| OTHERS |

FIG. 30

[ADVICE] IT IS DESIRABLE FOR A HEIR WHO ACTUALLY PLAYS GOLF IN THAT GOLF CLUB TO SUCCEED THE GOLF MEMBERSHIP.

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTI-TIONED |
| LAND FOR DWELLING | 4,000 | 4,000 | | | | | | | 0 |
| HOUSE FOR DWELLING | 2,400 | 2,400 | | | | | | | 0 |
| CASH, SAVING & DEPOSIT | 27,000 | | | | | | | | 27,000 |
| LISTED STOCKS & BONDS | 0 | | | | | | | | 0 |
| GOLF MEMBERSHIP | 7,000 | | 7,000 | | | | | | 0 |
| LIFE INSURANCE | 40,000 | 40,000 | | | | | | | 0 |
| TOTAL | 80,400 | | | | | | | | 27,000 |

| NEXT |
|---|
| MORE DETAILED INFORMATION IS REQUIRED |
| EXPLAIN MEANING OF TERMS |
| OTHERS |

FIG. 31

[ADVICE] CASH, SAVINGS, DEPOSITS, DEATH RETIREMENT ALLOWANCE, CONDOLENCE MONEY, INSURANCE MONEY WHOSE BENEFICIARY IS NOT DETERMINED, ETC, CAN BE USED AS THE FUND FOR TAX PAYMENT OR A METHOD OF RECEIVING THEM WHICH IS SUITABLE FOR MAKING PARTITION EQUAL CAN BE WORKED OUT.

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTI-TIONED |
| LAND FOR DWELLING | 4,000 | 4,000 | | | | | | | 0 |
| HOUSE FOR DWELLING | 2,400 | 2,400 | | | | | | | 0 |
| CASH, SAVING & DEPOSIT | 27,000 | | | | | | | | 27,000 |
| LISTED STOCKS & BONDS | 0 | | | | | | | | 0 |
| GOLF MEMBERSHIP | 7,000 | | 7,000 | | | | | | 0 |
| LIFE INSURANCE | 40,000 | 40,000 | | | | | | | 0 |
| TOTAL | 80,400 | 46,400 | 7,000 | | | | | | 27,000 |
| CALCULATED TAX AMOUNT | 8,500 | 4,905 | 740 | | | | | | 2,855 |
| DEDUCTION AMOUNT | | 4,250 | 1,740 | | | | | | |

| NEXT |
|---|
| MORE DETAILED INFORMATION IS REQUIRED |
| EXPLAIN MEANING OF TERMS |
| OTHERS |

[ADVICE] AFTER THE PARTITION HAS THUS BEEN MADE, REVISE FREELY THE PLAN IN VIEW OF ADVICES GIVEN SO FAR.

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTI-TIONED |
| LAND FOR DWELLING | 4,000 | 4,000 | | | | | | | 0 |
| HOUSE FOR DWELLING | 2,400 | 2,400 | | | | | | | 0 |
| CASH, SAVING & DEPOSIT | 27,000 | | 5,000 | 20,000 | 2,000 | | | | 0 |
| LISTED STOCKS & BONDS | 0 | | | | | | | | 0 |
| GOLF MEMBERSHIP | 7,000 | | 7,000 | | | | | | 0 |
| LIFE INSURANCE | 40,000 | 40,000 | | | | | | | 0 |
| TOTAL | 80,400 | 46,400 | 12,000 | 20,000 | 2,000 | | | | 0 |
| CALCULATED TAX AMOUNT | 8,500 | 4,905 | 1,269 | 2,114 | 211 | | | | 0 |
| DEDUCTION AMOUNT | | 4,250 | | 1,740 | | | | | 0 |
| TAX AMOUNT TO BE PAID | | 2,509 | 655 | 1,269 | 374 | 211 | | | 0 |

| NEXT |
|---|
| MORE DETAILED INFORMATION IS REQUIRED |
| EXPLAIN MEANING OF TERMS |
| OTHERS |

[ADVICE] IT IS ADVISABLE TO PLAN AND EXECUTE POSITIVERY THE MEASURES
 FOR THE INHERITANCE AND DONATION WHILE ONE IS SOUND AND HEALTHY BE-
 CAUSE THE EFFECTIVE INHERITANCE MEASURES ARE TIME-CONSUMING. A WILL
 IS EFFECTIVE TO AVOID ANY DISPUTE ABOUT THE SUCCESSION. THE WILL
 INCLUDES THREE SYSTEMS, i.e. A HOLOGRAPH WILL, AN ATTESTED DOCUMENT
 WILL AND A SECRET DOCUMENT WILL. BRING THE WILL TO A FAMILY COURT
 WITHOUT OPENING IT FREELY.

| NEXT |
| --- |
| MORE DETAILED INFORMATION IS REQUIRED |
| EXPLAIN MEANING OF TERMS |
| OTHERS |

3304

| EXPLANATION OF TERMS |
| --- |
| TERM ? ATTESTED DOCUMENT WILL |
| [HOLOGRAPH WILL] THIS IS THE SYSTEM WHEREIN ONE WRITES BY HIMSELF THE FULL CONTENT OF THE WILL, DATE AND NAME AND PUTS A STAMP BELOW HIS NAME. THE MERIT OF THIS SYSTEM IS THAT IT IS THE SIMPLEST BECAUSE ONE CAN PREPARE BY HIMSELF AND THE PREPARATION OF THE WILL ITSELF CAN BE KEPT SECRET. THE DEMERIT OF THE WILL IS THAT IT IS LIKELY TO BE LOST OR FABRICATED.<br>[ATTESTED DOCUMENT WILL] THE TESTATOR STATES ORALLY THE CONTENT OF HIS WILL IN THE PRESENCE OF TWO WITNESSES AND A NOTARY PUBLIC TAKES NOTE OF, AND READS, THE CONTENT AND THEN EACH PARTY PUTS HIS SIGNA-TURE AND STAMP. SINCE THE ORIGINAL OF THE WILL IS KEPT IN THE NOTA-RY'S OFFICE, IT IS FREE FROM LOSS AND FABRICATION OR FROM BEING MADE INVALID BECAUSED OF INSUFFICIENCY OF FORMALITY. HOWEVER, SOME EXPENSES ARE NECESSARY FOR THE NOTARY, THE PROCEDURE IS RATHER COM-PLICATED AND THE CONTENT OF THE WILL CANNOT BE MADE SECRET. |

| NEXT |
| --- |
| MORE DETAILED INFORMATION IS REQUIRED |
| EXPLAIN MEANING OF TERMS |
| OTHERS |

[ADVICE] CLARIFY WHILE YOU ARE HEALTHY WHAT KINDS OF PROPERTIES AND LOANS YOU HAVE. PARTICULARLY IF YOUR LEND SOME MONEY TO YOUR FRIENDS, YOUR HEIRS CANNOT KNOW THIS IN MOST CASES. SINCE THE PRICES OF THE STOCKS, BONDS, REAL ESTATE, ETC CHANGE, IT IS BETTER TO RE-EVALUATE THEM EVERY YEAR.

| NEXT |
|---|
| MORE DETAILED INFORMATION IS REQUIRED |
| EXPLAIN MEANING OF TERMS |
| OTHERS |

| CHANGE GIFT PLAN | —3402 |
|---|---|
| CHANGE PROPERTY ORGANIZATION | |
| CHANGE SUCCESSION PLAN | |
| STORE PLAN AS ALTERNATIVE | |
| FETCH ALTERNATIVE PLAN | |
| DISPLAY ALTERNATIVE PLAN | |
| SPEED UP | |
| ADVICE | |
| END OF CONSULTATION | |

3403

THE PRESENT PLAN IS STORED AS "PLAN2". SELECT "EXTRACTION OF ALTERNATIVES" WHEN YOU WANT TO EXTRACT AND REVISE IT AND SELECT ONLY "DISPLAY OF ALTERNATIVES" WHEN YOU WANT ONLY TO DISPLAY.

| CHANGE GIFT PLAN |
|---|
| CHANGE PROPERTY ORGANIZATION |
| CHANGE SUCCESSION PLAN |
| STORE PLAN AS ALTERNATIVE |
| FETCH ALTERNATIVE PLAN |
| DISPLAY ALTERNATIVE PLAN |
| SPEED UP |
| ADVICE |
| END OF CONSULTATION |

3404

| INHERITANCE PLAN | | | | | | | | | |
|---|---|---|---|---|---|---|---|---|---|
| | ESTIMATED PROPERTY | SPOUSE | CHILD1 | CHILD2 | CHILD3 | GRAND-CHILD1 | GRAND-CHILD2 | GRAND-CHILD3 | UNPARTI-TIONED |
| LAND FOR DWELLING | 4,000 | | 4,000 | | | | | | 0 |
| HOUSE FOR DWELLING | 2,400 | | 2,400 | | | | | | 0 |
| CASH, SAVING & DEPOSIT | 27,000 | | 5,000 | 20,000 | 2,000 | | | | 0 |
| LISTED STOCKS & BONDS | 0 | | | | | | | | 0 |
| GOLF MEMBERSHIP | 7,000 | | 7,000 | | | | | | 0 |
| LIFE INSURANCE | 40,000 | 40,000 | | | | | | | 0 |
| TOTAL | 80,400 | 40,000 | 18,400 | 20,000 | 2,000 | | | | 0 |
| CALCULATED TAX AMOUNT | 8,500 | 4,170 | 1,960 | 2,114 | 211 | | | | |
| DEDUCTION AMOUNT | | 4,250 | | 1,740 | | | | | |
| TAX AMOUNT TO BE PAID | 2,590 | 0 | 1,960 | 374 | 211 | | | | |

| |
|---|
| REVISION OF LIFETIME DONATION PLAN |
| REVISION OF PROPERTY CONSTITUENT CHANGE PLAN |
| REVISION OF INHERITANCE PLAN |
| PLANNING OF ALTERNATIVES |
| EXTRACTION OF ALTERNATIVES |
| DISPLAY OF ALTERNATIVES |
| SPEED UP |
| ADVICE |
| END OF CONSULTATION |

3405

REGISTER THE CONTENT OF CONSULTATION BECAUSE YOUR ADVICE IS NECESSARY WITHIN COMING THREE MONTHS.

THE CONTENT OF CONSULTATION MAY BE EXTINGUISHED BECAUSE THERE IS NOT ANY SUBJECT OF CONSULTATION ANY MORE.

3406

THE CONTENT OF YOUR CONSULTATION IS REGISTERED WITH A NUMBER "8703151520". PLEASE TAKE NOTE OF THIS NUMBER FOR YOUR NEXT CONSULTATION.

YOUR CODE NUMBER IS [    ].

CONSULTATION IS OVER. PUT YOUR IMPRESSIONS AND OPINIONS, IF ANY.

3407

| | |
|---|---|
| UNKNOWN INFORMATION IS OBTAINED. | I'D LIKE TO EXECUTE MY PLAN ON THE BASIS OF THIS INFORMATION. |
| HELPFUL CALCULATION/RESULT IS OBTAINED. | I'LL FURTHER EXAMINE IF THE PLAN IS EXECUTED OR NOT. |
| NO HELPFUL INFORMATION IS OBTAINED. | MORE DETAILED CONSULTATION IS NECESSARY. |
| I CANNOT WELL UNDERSTAND. | MORE DETAILED CALCULATION IS NECESSARY. |
| I CANNOT KNOW WELL HOW TO OPERATE. | MODIFY THE SYSTEM TO ATTAIN EASIER OPERATION. |

THANK YOU FOR USE. PLEASE PUT ANY QUESTIONNAIRES OR OPINIONS TO THE FORM FOR OUR REPLAY AFTER EXAMINATION.

INHERITANCE CONSULTATION EXPERTS' SYSTEM
XX BANK

FIG. 37

| | QUESTIONS | NECESSITY OF MODIFICATIONS | PREFIX | SUFFIX | CANDIDATE 1 | CANDIDATE 2 | CANDIDATE 3 | DEFAULT | INPUT |
|---|---|---|---|---|---|---|---|---|---|
| | (21) | (22) | (23) | (24) | (25) | (26) | (27) | (28) | (29) |
| 1 | GENERATION | NO | I WAS BORN IN | | SHOWA | TAISHO | | SHOWA | SHOWA |
| 2 | SEX | YES | AND AM | . | MALE | FEMALE | | MALE | FEMALE |
| 3 | OCCUPATION | YES | MY OCCUPATION IS | | COMPANY EMPLOYEE | PUBLIC SERVANT | SELF-MANAGEMENT | COMPANY EMPLOYEE | |
| 4 | INCOME | NO | AND MY INCOME | . | HIGHER THAN AVERAGE | HIGHER THAN AVERAGE | LOWER THAN AVERAGE | AVERAGE | |
| 5 | WORKING | YES | I | AT PRESENT | WORK | DO NOT WORK | | DO NOT WORK | |
| 6 | BASIC ANNUITY | YES | AND | CONTRACTED THE BASIC ANNUITY. | HAVE | DO NOT HAVE | | HAVE | |

I WAS BORN IN [SHOWA] / TAISHO AND AM [MALE] / FEMAIL .

MY OCCUPATION IS [COMPANY EMPLOYEE] / PUBLIC SERVANT / SELF-MANAGEMENT AND MY INCOME IS [HIGHER THAN AVERAGE] / AVERAGE / LOWER THAN AVERAGE . I [HAVE] / DO NOT HAVE WIFE.

FIG. 39(b)

I WAS BORN IN [SHOWA] / TAISHO AND AM MALE / [FEMAIL] .

I WORK / [DO NOT WORK] AT PRESENT AND [HAVE] / DO NOT HAVE CONTRACTED THE BASIC ANNUITY.

| LIFETIME DONATION PLAN | | | | | | | | | | | |
|---|---|---|---|---|---|---|---|---|---|---|---|
| DEDUCTION AVAILABLE | DONATED PROPERTY | SPOUSE | CHILD 1 | CHILD 2 | CHILD 3 | GRANDCHILD 1 | GRANDCHILD 2 | GRANDCHILD 3 | AMOUNT RECEIVED BY MAN/ YEAR | DONATION AMOUNT | DONATION TAX AMOUNT | DECLA- RATION |
| SPOUSE'S DEDUCTION | LAND FOR DWELLING | ○ | | | | | | | | 6,000 | 0 | NECES- SARY |
| SPOUSE'S DEDUCTION | HOUSE FOR DWELLING | ○ | | | | | | | | 3,600 | 0 | NECES- SARY |
| SPECIAL HANDI- CAPPED | LISTED STOCKS, BONDS, ETC | | | ○ | | | | | 30,000 | 30,000 | 0 | NECES- SARY |
| HOUSE ACQUISI- TION FUND | CASH, DEPOSIT & SAVING | ○ | | | | | | | 5,000 | 5,000 | 200 | NECES- SARY |

COMPUTER SYSTEM WITH EASY INPUT MEANS FOR CONSULTATION

BACKGROUND OF THE INVENTION

This invention relates to a computer system for storing expertise and processing know-how of consultation and gives advice on the basis of them. More particularly, the present invention relates to a computer system for consultation suitable for such a case wherein plans must be drawn up while diaglogues are exchanged between a computer system and a client asking an advice. Furthermore, the present invention relates to an information input system in a computer system for consultation or the like and more particularly to an information input system for displaying an input request which will be suitable for an information processing system wherein necessary input items are changed by inputted values.

A conventional computer system for consultation is described, for example, in "Personal Finance Adviser Using "SHELL" by Monzen, the material of The 3rd Artificial Knowledge Promotion Committee, Application System No. 2 Expert Committee (1986). This reference discloses a system wherein inputs are first made altogether, answers are then given and finally, any questions are selected by a client asking the consultation. While the answer is given, the client asking the consultation can only input a return key to proceed to the next answer and the system outputs the answer one-sidedly.

This system involves little ongoing interaction between it and the user client. The system operations such as the input, answer and question are fixed and the system does not take the reaction of the client asking the consultation into consideration. In other words, this system does not take into consideration those items which are believed essentially necessary in the consulting business such as the explanation of terms, detailed explanation in accordance with the knowledge of the client asking the consultation, switch of the topics, time adjustment and additional functions such as printing, preparation and comparison of alternative plans, registration for interrupting the consultation, necessary modification procedures to reflect client's desire, the input in the more natural language form useful for improving the interface with the client asking the consultation, the advertisement of the party offering the consultation system, collection of client's information, and so forth.

Particularly, an appropriate information input method must be considered in order to let the client asking the consultation use the system more easily, and the prior art technique includes the following method in this respect.

The input system of an information processing system such as the computer system for consultation comprises the repetition of the steps of outputting question symbols meaning the input request by the system, receiving the input and outputting the next input request after completion of the former. The input method of this kind is described, for example, in Patric Henry Winston et al. "LISP", pp. 245-249 Addison Wesley.

The conventional input method described above does not consider how to enable the user of the system to make an input on the trial-and-error basis or how to simplify the input operation. If the user realizes the previous error at a stage after several steps, he cannot try again the input but must make it once gain from the start, or the user has to make unnecessary information input.

SUMMARY OF THE INVENTION

It is therefore an object of the present invention to provide a computer system for consultation which eliminates the problems of the prior art technique described above, which can select and make an answer in accordance with the intention, desire and reaction of a client and which will possibly improve the business results of a company offering the system.

It is another object of the present invention to provide an information input system which eliminates the problems of the conventional information input systems described above and makes it possible to input the information in irregular order and to try again the information input.

These and other objects, features and advantages of the invention will appear more fully from the following description when taken in conjunction with the accompanying drawings.

To accomplish the objects described above, the computer system for consultation in accordance with the present invention includes first, in a storage unit, each memory area for storing expert's knowledge or expertise in the field of consultation, status of a client asking consultation, reply, intention of the client, processing know-how of the consultation and the progress status of consultation. This expertise area includes an advice rule area consisting of a premise condition area and a reply generation area, and the statement for making reference to the status of the client asking the consultation, his intention, the progress status of consultation and reply are stored in this premise condition area. Accordingly, a reply is selected and offered in accordance with the status of the client, his intention and the progress status of consultation.

A preferred embodiment of the present invention utilizes a sentence which has a blank or blanks only for an input value or values or choices so that the client can easily understand the content to be inputted or can easily make the input operation. Another input method will be described elsewhere.

The computer system of the present invention is provided with the function of storing and displaying advertisement or the like in association with the reply to the consultation, the function of defining the advertisement and the function of calling the procedures for inputting and collecting the necessary information such as the opinions of the client for the company or business concern who offers the consultation system.

Next, the action brought forth by the construction described above will be explained.

At the start of consultation, whether or not the client uses the system for the first time or has and been registered is inquired. If the client previously used the system, the procedure for reading out the content of consultation that has been registered is called in accordance with the request of the client and the consultation can be started again from the content of consultation that has been registered.

When the consultation is started, inference processing selects and gives an appropriate advice in accordance with the level of expertise in the field of consultation, the status of the client (e.g., his familty status), the intention of the client (e.g., object of consultation), the knowledge on the process of consultation and the status of progress of consultation.

If an advertisement in connection with the reply is stored, it is also displayed with the reply. If the call for the reaction check procedure passes a designated portion in the expertise during the reply process, the reaction check procedure is actuated.

The reaction check procedure first lists up the reaction of the client that can be coped with, and displays them as a menu. The client selects the one that is most approximate to his feeling. The reaction check procedure makes processing in accordance with the selected reaction. When a specific kind of reaction is selected, the progress status is updated and the flow returns to inference of the expertise. When the end of consultation is selected, the consultation is finished after suitable processing. When the remaining kinds of reactions are selected, the selectable menu is displayed once again.

When the consultation is complete, the procedures for registration of the consultation content, the client's opinion about the consultation system after use and collection of necessary information are carried out.

When an inquiry is made to the client during the process described above, a sentence having a blank or blanks into which the client must input is displayed. If the allowable inputs are limited, the questionnaires are listed and displayed as choices. If the contents which must be inputted once cannot be put into one sentence, a plurality of sentences are listed and displayed. The client reads the sentence displayed and when a plurality of sentences are displayed, he selects one sentence which is in conformity with his status. Furthermore, the client of the system inputs the values into the blanks or selects them from the choices so as to complete one sentence and thus to complete the input operation.

Another input method forms a sentence or the aggregate of paragraphs as part of the sentence by the combination of words defining the input items necessary for the execution of a processing with displays representing the input request items, forms a sentence representing a case by combining them and sets a value for the input request item of this sentence. This input method involves the steps of determining in advance a value expected for an input item, deciding the subsequent input item in accordance with the value, forming a sentence or a paragraph by the words explaining the item and the expected value, representing the sentences or paragraphs to form a sentence and accepting the change of the value of an arbitrary item.

In other words, a rule determining which should be inquired next after the value of an input item is determined is stored in the system so that when the input processing is made actually, the sentence prepared by the subsequent input items is extinguished on the display and the sentence is formed by only the necessary items by the rule. Therefore, no input processing is executed for the unnecessary items. Since the input processing is irrelevant to the sequence of the display of the items, return and jump can be made freely.

Besides the consultation process described above, advertisement is defined by evoking an editor which modifies only the advertisement.

BRIEF DESCRIPTION OF THE DRAWINGS

FIG. 3 is a structural view of an example of a working memory;

FIG. 4 is a structural view of an example of an expertise area by a meta-rule expression;

FIG. 5 is a structural view of an example of an expertise area by rule expression;

FIG. 8 is a structural view of an example of a progressing area;

FIG. 9 is a structural view of an example of an advertising area;

FIG. 14 is a structural view of a Q & A table;

FIGS. 15 to 34(c) are tables showing various pictures displayed on a display at various steps;

FIG. 37 shows an example of a table of questions;

FIGS. 39(a) and 39(b) show the change of display by the information inputting method in the present invention.

DESCRIPTION OF THE PREFERRED EMBODIMENTS

An example of a consultation system relating to the inheritance tax will be hereinafter explained as an embodiment of the present invention with reference to FIGS. 1 to 34.

Furthermore, an inputting method applied to such a consultation system or the like will be explained with reference to FIGS. 35 to 39. [Overall structure of the embodiment]

Figure 2:
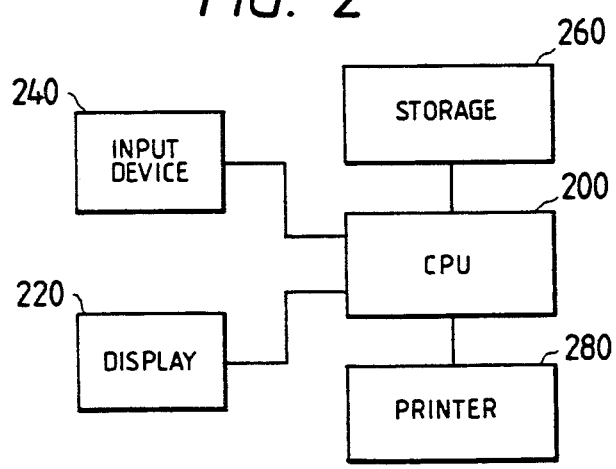
FIG. 2 is a block diagram showing the system configuration of one embodiment of the present invention.

First of all, the system configuration of one embodiment of the present invention will be explained with reference to FIG. 2. This system comprises a central processing unit (CPU) 200 for executing various procedures such as inference processing and various other procedures and for storing various knowledges and status, a display 220 for displaying a sentence of question and a reply inclusive of plans, etc., an input device 240 for inputting the reply of a consulting party to the question, an external storage 260 for registering the content of consultation and a printer 280 for printing the answer, and the like.

Figure 1:
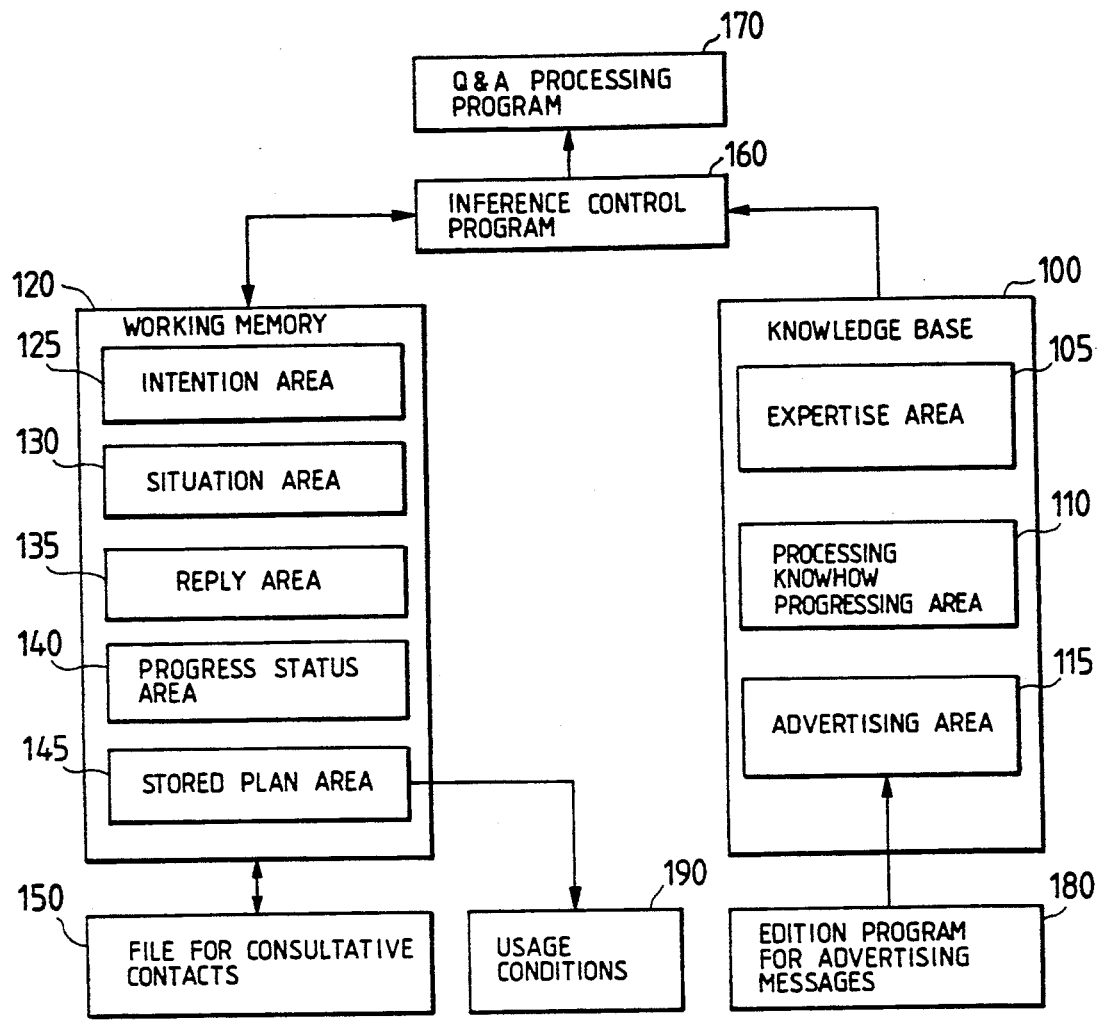
FIG. 1 is a block diagram useful for explaining the function and construction of one embodiment of the present invention.

Next, the functional construction of this embodiment will be explained with reference to FIG. 1. A knowledge base 100 comprises an expertise area 105 for storing the expertise in the field of consultation a processing know-how area 110 for storing the know-how on the processing of consultation which is not dependent on the field of consultation, and an advertising area 115 for storing the advertisement of a company or a party who disposes this system.

A working memory 120 comprises an intention area 125 for storing the object of consultation and requests of the client to the reply, a situation area 130 for storing the status on the content of consultation, a reply area 135 for storing an expert's reply, a progress status area 140 for storing the progress status of consultation and a stored plan area 145 for storing an alternative when a plan is made while the consultation is being made.

A file for consultative content 150 is a file for storing all the contents of the working memory 120. An inference control program 160 refers to the knowledge base 100 and the work memory 120, re-writes the working memory 120 and calls the Q & A processing program 170. Both of the inference control program 160 and the Q & A processing program 170 are those programs which are executed by CPU 200. An edition program 180 for advertising messages is a program that edits the advertisement in the advertising area 115 and is executed independently of the inference control program. A usage condition area 190 stores part of the content of the working memory 120. The client can make access to each area by generating various commands through the input device 240.

The functional structure in FIG. 1 can be made to correspond to the system configuration in FIG. 2 in the following way. The program of each of the inference control program 160, the Q & A processing program 170 and the edition program 180 for advertising messages is executed by CPU 200. The working memory 120 and the knowledge base 100 are disposed in the memories of CPU 200. However, when this system is not used, the knowledge base 100 is stored in the external storage 260 and is loaded to the memory in CPU 200 with the start of the operation of this system. The file for consultative contents 150 and the usage condition area 190 are files that are disposed in the external storage 260.

In order to have the operation of the later-appearing system of the present invention more easily understood, the structures of the work memory 120 and knowledge base 100 and the example of the display picture of the display 220 will be first explained.

FIGS. 15 to 34 show the display contents displayed on the display 220.

FIGS. 16 and 21 show the display pictures including legal heirs and FIG. 24(a) is a detailed explanatory view of the donation of a house acquisition fund. FIG. 16 includes a table of legal inheritance while FIG. 19 includes a table of an inheritance tax amount. FIG. 18 includes a table of properties. FIGS. 22, 23, 24(a) and 25 show each lifetime donation plan. FIGS. 27 to 31 illustrate each succession plan table. These tables are displayed in windows separate from other input/output and left displayed on the display surface until they are re-written by the same kind of tables (such as those shown in FIGS. 15 to 34(c)).

The structure of the work memory 120 will be explained with reference to FIG. 3. A client frame 300 in the intention area 125 displays "The object of consultation of the client is about the preparations for inheritance in the future, a scheduled time is 2 hours, his knowledge about the inheritance tax is ordinary (has some idea) and the operation is inexperienced (he uses the system for the first time)" which is clarified by the input/output 1502 and 1504 (FIG. 15). The "person 2" frame 320 of the situation area 130 displays "The legal heir has a healthy and adult spouse" which is clarified by the input/output 1602 and 1902 (FIGS. 16 and 19). The "property 1" frame displays "The ancertor has a land for dwelling the average of which is 300 m² and the market price of which is ¥28,600,000. The reply status frame 340 of the reply area 135 displays that advices such as decision of legal heirs, input and evaluation of the property, neglected property items, the property to be donated, donees, utilization of spouse's deduction of the donation tax, trust for special handicapped, etc., have already been given and that the plan which is now being made is the plan 2. The frame 350 of the lifetime donation plan 3 displays a plan of donating ¥30,000,000 of listed stocks and bonds shown in FIG. 23 as a trust for the special handicapped to the person 3. The progress status frame 360 of the progress status area 140 displays that the reply is given at present about the house acquisition fund among the lifetime donation, the elapsed time is 20 minutes and the remaining time is 100 minutes. A stored plan frame 380 of the stored plan area 145 displays that there is a plan 1 as an alternative.

Figure 6:
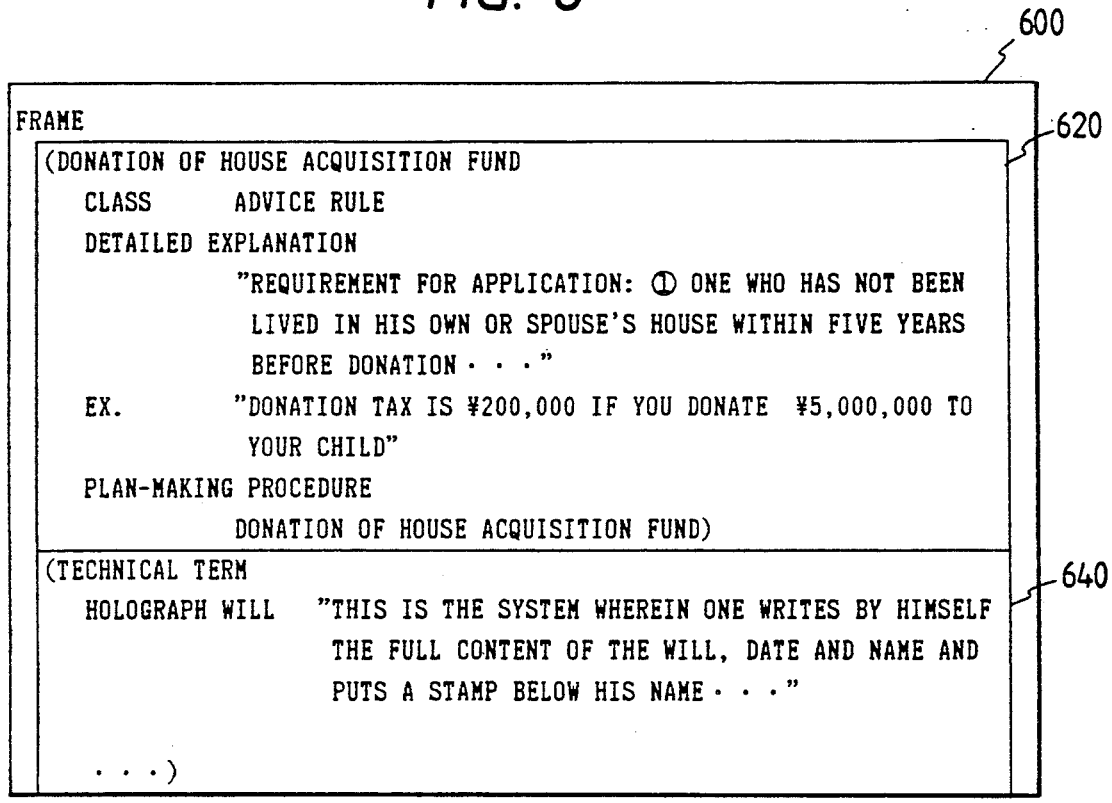
FIG. 6 is a structural view of an example of an expertise area by frame expression.
Figure 7:
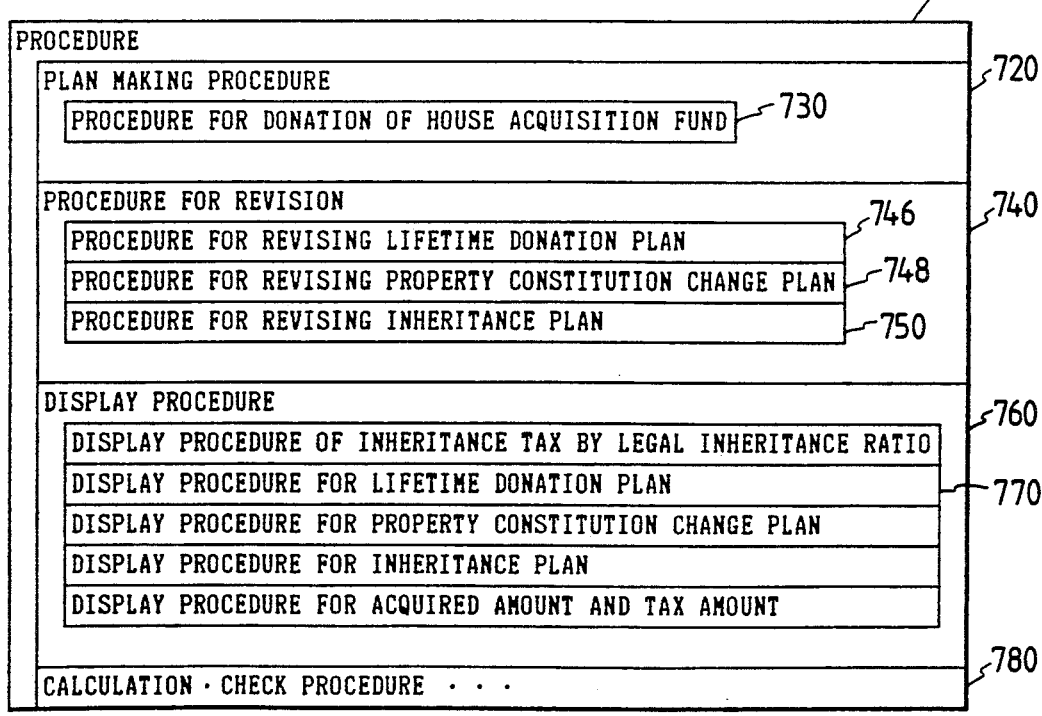
FIG. 7 is a structural view of an example of an expertise area by procedure expression.

Next, the structure of the expertise area 105 relating to the inheritance tax will be explained with reference to FIGS. 4 to 7. The expertise area 105 comprises a meta-rule area 400 (FIG. 4), a meta-rule area 500 (FIG. 5), a meta-rule area 600 (FIG. 6) and a procedure area 700 (FIG. 7). The meta-rule area 400 will be explained with reference to FIG. 4. The meta-rule 440 for the preparations for inheritance in the future designates the execution of eight rule groups in accordance with priority such as the decision of legal heirs when the consultation relates to the preparations for inheritance in the future. The rule area 500 will be explained with reference to FIG. 5. The rule area 500 comprises ten rule groups such as an intention grasp rule group 505. A lifetime donation rule group 530 includes a utilization rule 535 of the spouse's deduction of the donation tax, a trust rule 540 for a special handicapped, a donation rule 545 of the house acquisition fund, and the like. The rule 545 includes a premise condition portion "if . . ." and a reply generation portion "then . . .". The donation rule 545 of the house acquisition rule represents that the remaining time is more than 30 minutes, asks "whether or not any child(ren) or grandchild(ren) who does not have his own house at present but plans to get it in future?" if the ancestor has a child(ren) or a grandchild(ren) as represented by the input/output 2402 (FIG. 24(a)), and if such a child(ren) or grandchild(ren) exists, displays the advice and advertisement such as the output 2403.

Next, a frame area 600 will be explained with reference to FIG. 6. A donation frame 620 of the house acquisition fund represents the detailed explanation of the donation rule 545 of the house acquisition fund, an example and the names of planning procedure on the basis of the advice. A term frame 640 stores the definition of term "holographic will", and the like. The procedure area 700 will be explained with reference to FIG. 7. The procedure area 700 consists of a planning procedure 720, a revision procedure 740, a display procedure 760, a calculation/check procedure 780, and the like. The donation procedure 730 of the house acquisition fund which is one of the planning procedures displays a recommended plan such as the input/output 2408 (FIG. 24(a)), accepts the input of the client and adds a frame relating to the lifetime donation plan. A succession plan revision procedure 750 which is one of the revision procedures displays a table such as the input/output 3404 (FIG. 34(b)), accepts the input of numeric values to be put into column(s) picked up by the client, calculates again the associated numeric values and displays them once again. The lifetime donation plan display procedure 770 which is one of the display procedures outputs a table such as the input/output 2502 (FIG. 25). As is obvious from this table, this lifetime donation plan is structural type data described by the combination of character strings, the inputted numeric values and the calculated numeric values.

Next, the structure of the processing know-how area 110 will be explained with reference to FIG. 8. The confirmative question procedure 805 questions whether or not the advice/reply is suitable, as the input/output 2402 (FIG. 24(a)). The advice presenting procedure 810 presents the advice and advertisement such as the input-/output 2403. The reaction checking procedure 815 presents the menu that can be employed as the measure such as the input/output 2405 or 3402 and executes processing in accordance with the selection of the client. Furthermore, the processing know-how area 110 includes the term explanation procedure 820, the detailed explanation procedure 825, the example procedure 830, the store procedure 835, the fetch procedure 840, the print procedure 845, the register procedure 850, the registered content read-out procedure 855, the questionnaire read-out procedure 860, the collection procedure 865, etc. Here, the processing know-how is the know-how for checking the reaction of the client and executes processing in accordance with the reaction. Therefore, the followings are provided as examples of general reactions which are not dependent on the field of consultation.

"I see""I'd like to do so by all means"0
→proceed reply
"I cannot well understand the term"
→explain the term
"I cannot well understand"
→present an example
"I'd like to know more in detail"
→make detailed explanation.
"I have no interest in this point"
→switch the topic
"I'd like to bring the result home"
→print the result
"Time is becoming short"
→focus on an important reply
"I'll come once again"
→register the consultative content Furthermore, when a plan is made while the consultation is being made, the reactions include the following:
"I cannot decide right now"
→prepare an alternative
"This plan is getting off from my desire"
→discard the plan
"I'd like to change this back to the previous plan"
→fetch the alternative
"I'd like to compare this with the previous plan"
→display the alternative
"How about . . .?"
→revise the plan in accordance with the client's desire Designation of the timing of call of the reaction checking procedure and the expertise necessary for coping with the reaction are stored in the expertise area.

Next, the advertising area 115 will be explained with reference to FIG. 9. The advertisement frame 900 displays the advertisement which is outputted simultaneously with the advice on the donation of the house acquisition fund.

The operation of the embodiment of the present invention will be described with reference to FIGS. 15 to 34(c).

Figure 10:
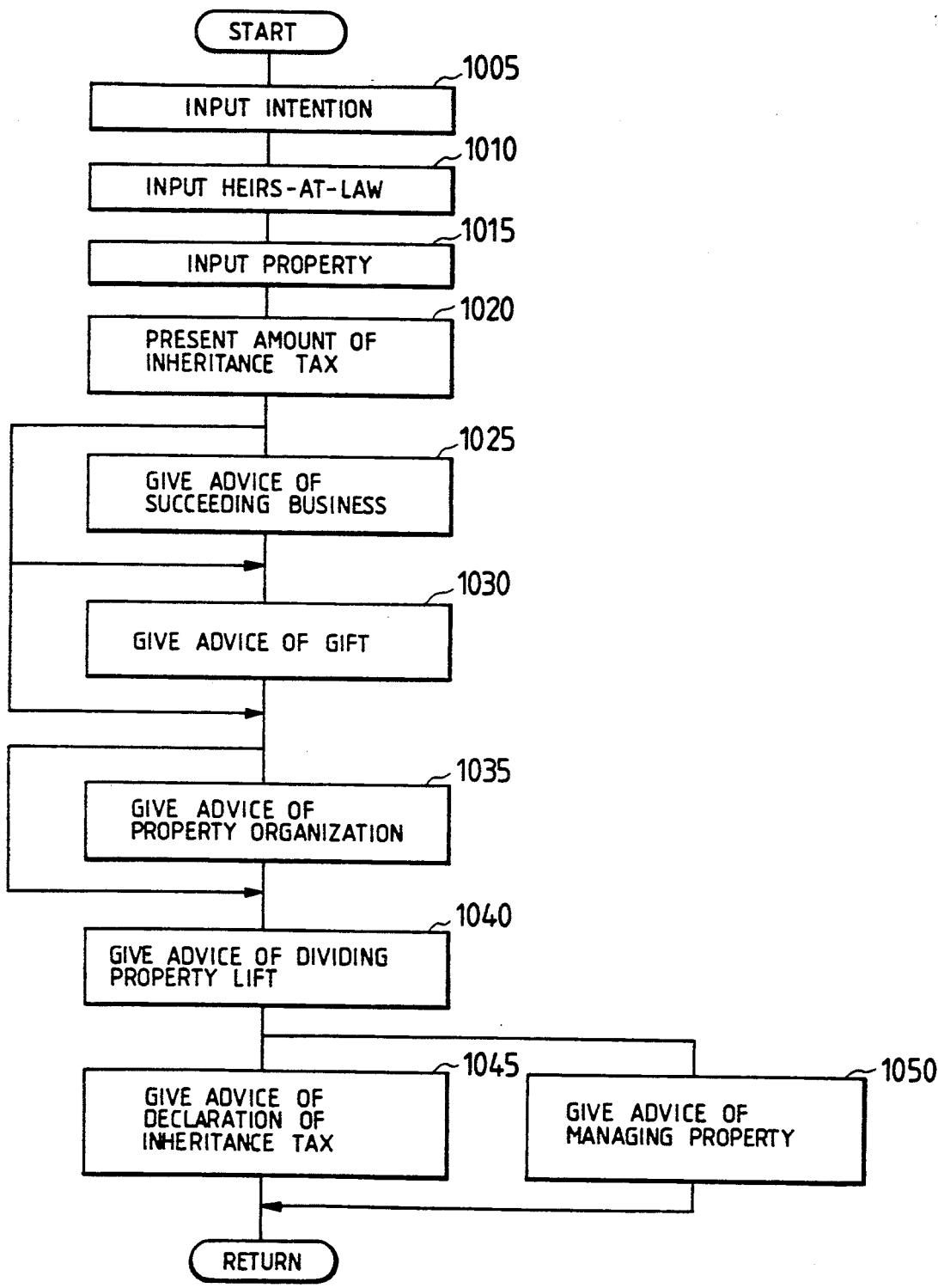
FIG. 10 is a flowchart showing the processing sequence by inference.

First of all, the flow of inference control will be explained with reference to FIG. 10. A step 1005 inputs the intention by the intention grasp rule group 505 as shown in FIG. 15. (The corresponding content is specified from among the choices displayed on the screen by the input/output device. This embodiment uses a pointing device (mouse) for picking and this is the same in the following input operations.) The flow proceeds then to the step 1010 where the legal heirs are inputted by the legal heir determination rule group 510 as shown in FIG. 16. The property is then inputted at the next step 1015 by the property assessment rule group 515 as shown in FIGS. 17 and 18. The inheritance tax amount is presented by the inheritance calculation rule group 520 at the step 1020 as shown in FIG. 19. If necessary, the flow proceeds to the step 1025 where an advice is given on the business succession by the business succession rule group 525. (This necessity is selected by the client and inputted by him, though the explanation of the processing content is hereby omitted.) If necessary, the flow proceeds to the step 1030 where an advice is given on the lifetime donation by the lifetime donation rule group 530 as shown in FIGS. 20 to 26. Next, if necessary, the flow proceeds to the step 1035 where an advice is given on the property constitution by the property constitution group 580. An advice is then given at the next step 1040 on the partition of the property by the property partition rule group 585 as shown in FIGS. 27 to 32.

If the flow proceeds to the step 1045, an advice is given on the declaration of the inheritance tax by the inheritance tax declaration rule group 590. If the flow proceeds to the step 1050, an advice is given on the investment of the property by the property investment rule group 595 as shown in FIGS. 33 and 34. The flows described above are controlled by the inference control area 160 on the basis of the data set by the inheritance preparation meta-rule 440. The processing of the inference control area 160 is the same as that of an ordinary production system. For example, the rule to be next executed in selected by collating the premise condition area (if area) of the house acquisition fund donation rule group 545 or the like with the work memory 120, and then the confirmative question procedure, the advice presenting procedure, the reaction checking procedure, etc., are called in accordance with the execution area (reply generation area, then area) of the selected rule.

Figure 11:
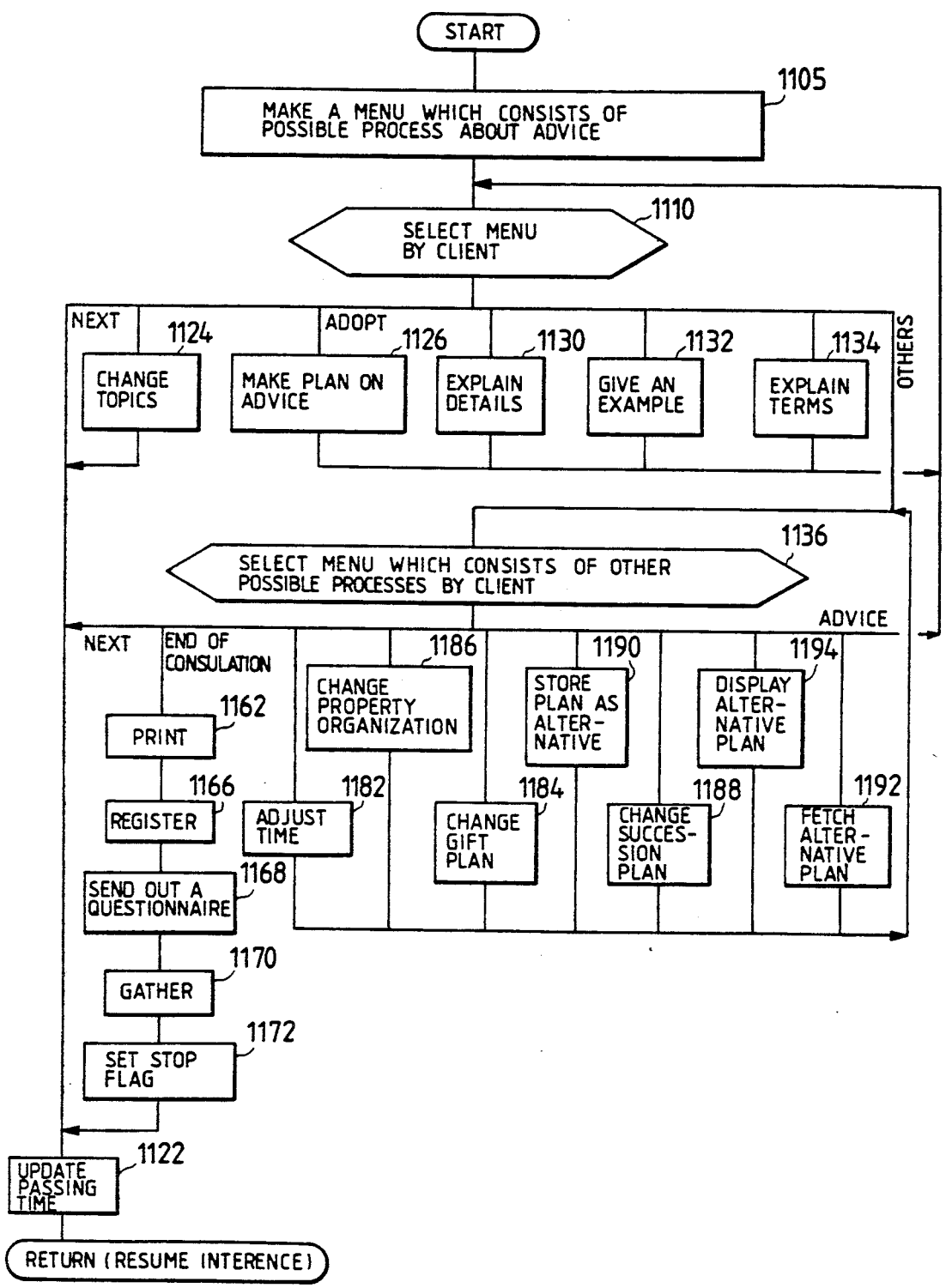
FIG. 11 is a flowchart showing the processing sequence by reaction checking procedure.

Next, the processing of the reaction checking procedure will be explained with reference to FIG. 11. The description will be given mainly on the case where the donation rule 545 of the house acquisition fund is selected by the inference control area described above and this procedure is called by the statement 548 in the execution area in the rule. The step 1105 decides the reaction that can be employed, such as the detailed explanation, by referring to the frame 620 corresponding to the present rule 545. Next, the step 1110 displays a menu 2405 consisting of possible process about advice and lets the client select it. The flow branches to steps 1122 to 1136 in accordance with the result of selection. If "next" is selected, the flow proceeds to the step 1122, where the consultation time and the remaining time 360 are updated. If "I'm not interested in the lifetime donation" is selected, the flow proceeds to the step 1124, where the remaining rules in the rule group to which the present rule belongs are designated to be out of the object of selection by the inference control area. If "I'd like to do so" is selected, the flow proceeds to the step 1126 and the plan making procedure 730 of the present rule is called. If the client selects "more detailed information is required" (e.g., 2405) through the input device, the flow proceeds to the step 1130, where the detailed explanation procedure 825 (FIG. 8) for presenting the detailed explanation 620 (FIG. 6) of the present rule is called and displayed such as the output 2406 (FIG. 24(a)). If "I'd like to examine an example" is selected, the flow proceeds to the step 1132, where the example presenting procedure 830 (FIG. 8) for displaying the example of the present rule is called and is displayed such as the output 2204. (However, FIG. 22 shows the case of the spouse's deduction of the donation tax.) If "explain the meaning of term" is selected, the flow proceeds to the step 1134, where the term explanation procedure 820 (FIG. 8) is called and the input/output operation is made such as the input/output operation 3304. (However, FIG. 33 shows the will as the term.) When "others" is selected, the flow proceeds to the step 1136, where the menu 3402 is displayed for the selection by the client. The flow branches from the steps 1122, 1162 and 1182 to the steps 1194, 1110 in accordance with the result of selection.

When "end of consultation" is selected, the flow proceeds to the step 1162, where the print procedure 845 is called and the given advice and the established plan are printed. Next, the flow proceeds to the step 1166, where the register procedure 850 is called and the input/output operations such as the inputs/outputs 3405, 3406 are carried out to output the data in the work memory 120 to the file 150 for the consultative content. Next, the flow proceeds to the step 1168, where the questionnaire procedure 860 is called and the input/output operation such as the input/output 3407 is carried out. The flow then proceeds to the step 1170, where the collection procedure 865 is called and useful data in the work memory 120 such as the result of questionnaire, etc. are outputted to the usage condition area 190. Next, the flow proceeds to the step 1172, where setting is made so that the inference control area selects the rule for finishing the consultation. If "speed up" is selected at the step 1136, the flow proceeds to the step 1182, where the remaining time is set once again by asking to the client and the consultation progress status 360.

When "lifetime donation plan revision", "property constitution plan revision" and "inheritance plan revision" are selected, respectively, the flow proceeds to the steps 1184, 1186 and 1188, respectively, where the lifetime donation plan revision procedure 746, the property constitution change plan revision procedure 748 and the inheritance plan revision procedure 750 are called, respectively. When "alternative generation" 3402 is selected, the flow proceeds to the step 1190 where the store procedure 835 is called and the present plan stored in the reply area 135 is copied in the store plan area 145. When "alternative fetch" is selected later at a different point of time, the flow proceeds to the step 1192, where the fetch procedure is called (3403) and the alternative selected by the client from the store plan area 145 is copied to rewrite the present plan inside the reply area 135. When "alternative display" is selected, the flow proceeds to the step 1194, where the alternative selected by the client from the store plan area 145 is displayed. At this time the present plan and the alternative are altogether displayed by the display means. When "advice" is selected, the flow proceeds to the step 1110.

Figure 12:
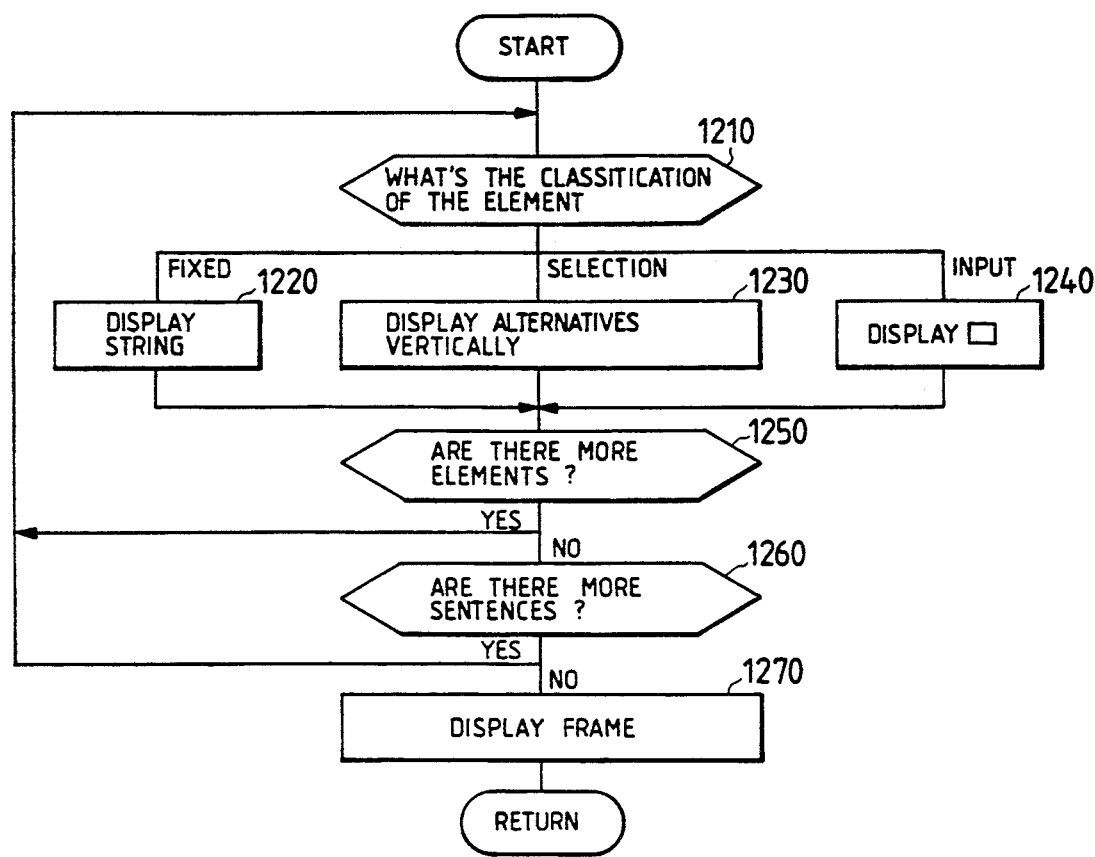
FIG. 12 is a flowchart showing a display processing sequence of a Q & A processing program.
Figure 13:
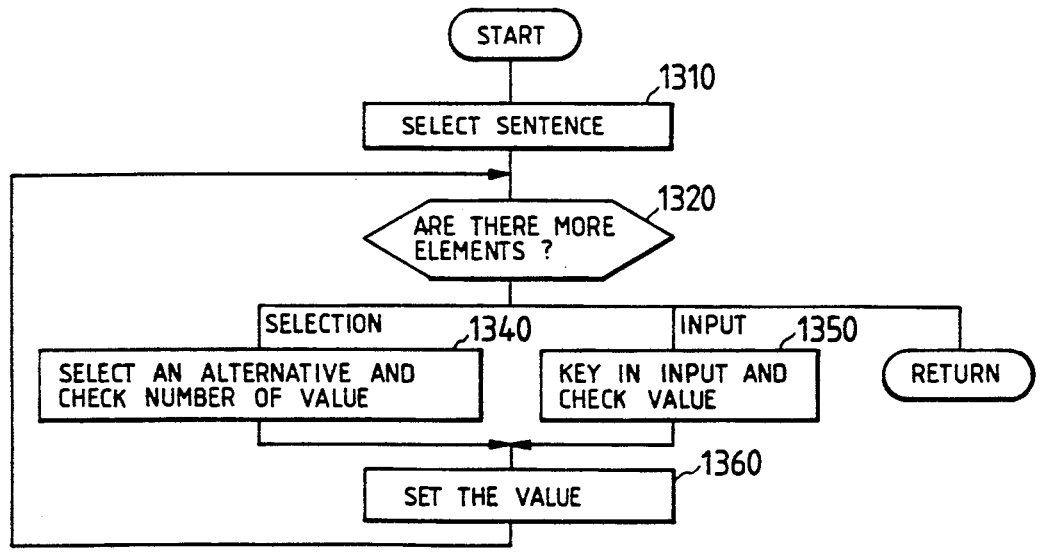
FIG. 13 is a flowchart showing the input processing sequence of the Q & A processing program.

Next, the processing of the Q & A processing program will be explained about the case of the input/output 1602 with reference to the flowcharts of FIGS. 12 and 13 and the questionnaire table of FIG. 14. The Q & A procedure is prepared by setting the questionnaire tables 1410 and 1420 before this processing is started. The number "4" of sentences 1412 represents that four sentences exist as the object of selection. The sentences as the first object of selection consists of a fixed element 1425, an element 1430 for which either "YES" or "NO" is selected, another fixed element 1435, an element for which a number is to be inputted, a fixed element 1445, an element 1450 for which a number is inputted and a fixed element 1455.

Next, the display processing of the Q & A procedure will be explained with reference to FIG. 12. The step 1210 branches in accordance with the classification 1460 of the elements of the sentence. If the classification of the element is fixed, the flow proceeds to the step 1220, where a character string is displayed as a value. If the classification of the element is selective, the flow proceeds to the step 1230, where the range of the value is displayed vertically and encompassed by a frame to make display ▭. The flow of the step 1250 proceeds to the step 1210 if the element of the sentence remains, in order to make processing, and to the step 1260 if they do not. If there remains any sentence which is the object of selection and is not yet displayed, the flow proceeds to the step 1210, where the leading element of the next sentence is processed. If there is no sentence any more, the flow proceeds to the step 1270, where a plurality of sentence as the object of selection, if any, are encompassed by a frame. As a result, the display 220 displays such as the input/output 1602 (FIG. 16).

The input processing of the Q & A procedure will be explained with reference to FIG. 13. At the step 1310, if there are a plurality of sentences as the object of selection, the pointing device such as the mouse as one of the input devices designates the coordinates and then the sentence selected from the coordinates are determined and outputted to the questionnaire table 1414. Next, the flow proceeds to the step 1320, where selection or input element of the information on the selected sentences of the questionnaire table is made or sought sequentially and the processing is complete if it does not exist. If there is the selected element, the flow proceeds to the step 1340, where the coordinate values are detected and determination of the selected values is repeated by the number of times represented by 1472. If the number of the value is not a constant value (below 3) or is the number expressed by the range such as from 3 to 5, the processing is repeated until the coordinates of the alternatives outside the frame are detected and the number of the selected value is checked. If it is the input element, the flow proceeds to the step 1350, where the input is accepted and the value is checked. Next, the flow proceeds to the step 1360, where the output is made to the questionnaire table 1420. The flow proceeds to the step 1320, where processing is made for the next element.

According to this embodiment, the question and answer can be made in accordance with the intention of the client, his family status and property condition and his reaction to the reply.

It is possible for the client to receive the explanation of the term, the explanation using the example, more detailed explanation and the like, whenever necessary, to make plans of the lifetime donation or the like while receiving the advice, to know the estimated amounts of the inheritance tax and the donation tax, to bring back the result of consultation after printing and to reserve further consultation some other day.

According to this embodiment, the input can be made by the sentence input like a sentence of natural words without keying-in and without leaving any fuzziness.

The bank offering the system of this embodiment can advertise the merchandizes of the bank in the consultation process in association with the reply, collect the property status of the client and obtain the opinions of the client after the use of the system.

Furthermore, since the printing and registration services can be offered with the consultation, the customer services can be improved.

Since this embodiment can store and display the advertising messages, it can sell a software.

Another embodiment of the part of the inputting method of the consultation system described above will be explained.

Figure 36:
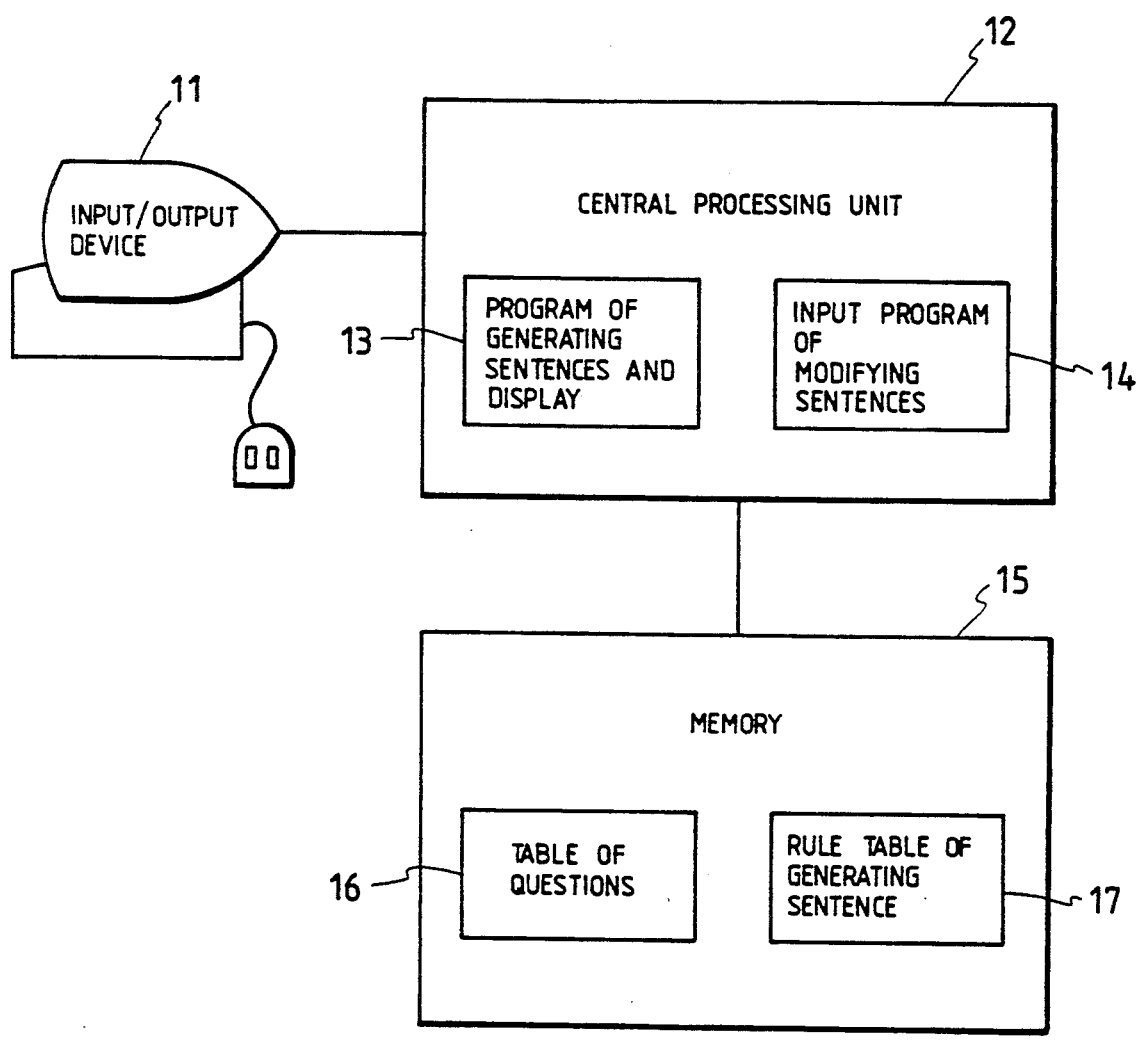
FIG. 36 is a block diagram showing the structure of an information input apparatus and useful for explaining the information inputting method.

FIG. 36 is a structural block diagram of a data input device for the inputting method of this embodiment. In the drawing, reference numeral 11 represents an input/output device equipped with a display, a keyboard and a pointing device, 12 is a central processing unit (CPU) equipped with a later-appearing program 13 for generating sentences and display and a program 14 for modifying the sentences, and 15 is a memory equipped with a table of questions 16 and a rule table for generating sentences 17.

When the data is inputted from the input area of the sentence displayed by the input/output device 11, the input program 14 for modifying the sentences of CPU 12 accepts it and stores it as the input data in the table 16 of questions in the memory 15. The program 13 for generating sentences and display of CPU 12 generates the sentence after the data input position of the display from the rule stored in the rule table 17 for generating sentences in the memory 15 and from the data stored in the table 16 of questions, and changes the display on the display.

FIG. 37 shows the structure of the table 16 of questions described above. The items of questions consist of a question 21, data 22 representing whether or not modification of sentence is necessary when the input data to the question is changed, prefix and suffix 23, 24 for generating a display statement or sentence on the display to the question, candidates 25, 26 and 27 of the input data, a default 28 of the input data and input 29 inputted in practice from the input/output device. Incidentally, FIG. 37 shows the state where the sex "female" is inputted as presented by arrow as a cursor on the screen in later-appearing FIG. 39(a).

Figure 38:
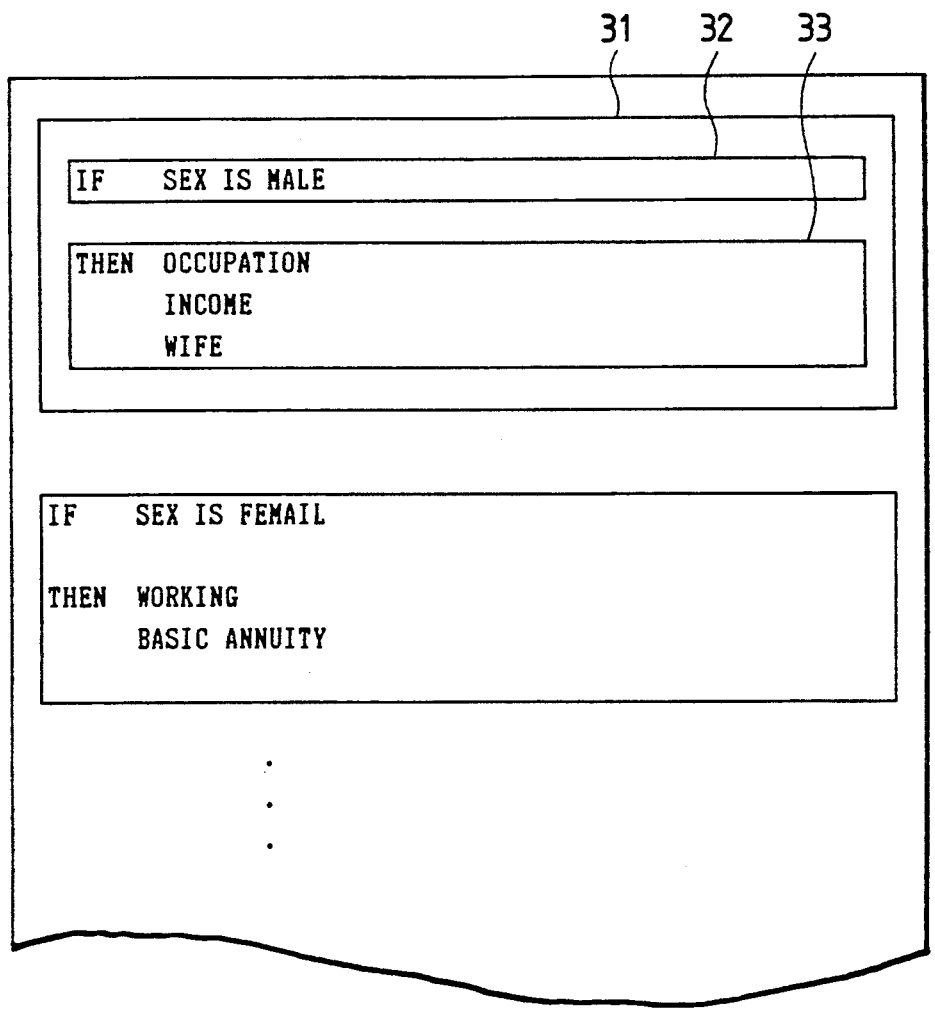
FIG. 38 shows an example of a rule table of generating sentences.

FIG. 38 shows the structure of the rule table 17 for generating sentences. The rule 31 consists of the if part 32 for judging whether or not the input data to the question of sex is "male", and the then part 33 representing the question items such as "occupation", "income", "Do you have wife?" for constituting the sentence at that time.

Figure 35A:
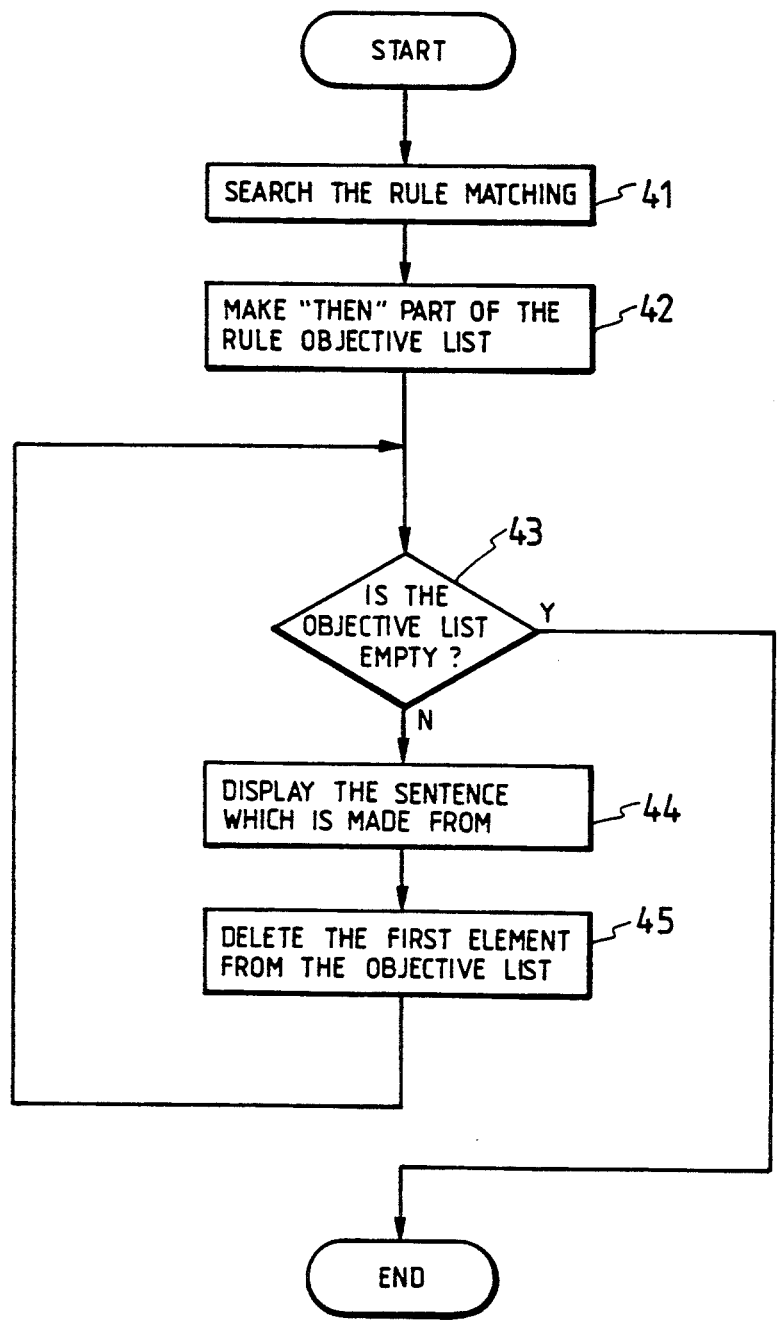
FIGS. 35(a) and 35(b) are flowcharts showing the control sequence of an information inputting method.

Next, the operation of the program 13 for generating sentences and display will be explained with reference to FIG. 35(a). First of all, a rule by which the input data coincides with the if part is found out at the step 41. Next, the then part of the rule is made the execution list of the following steps at the step 42. Whether or not the objective list disappears is judged at the step 43. If it does, the processing is complete and if it does not, the first element is displayed on the display. The first element is then omitted from the objective list at the step 45 and the flow returns to the step 43.

Figure 35B:
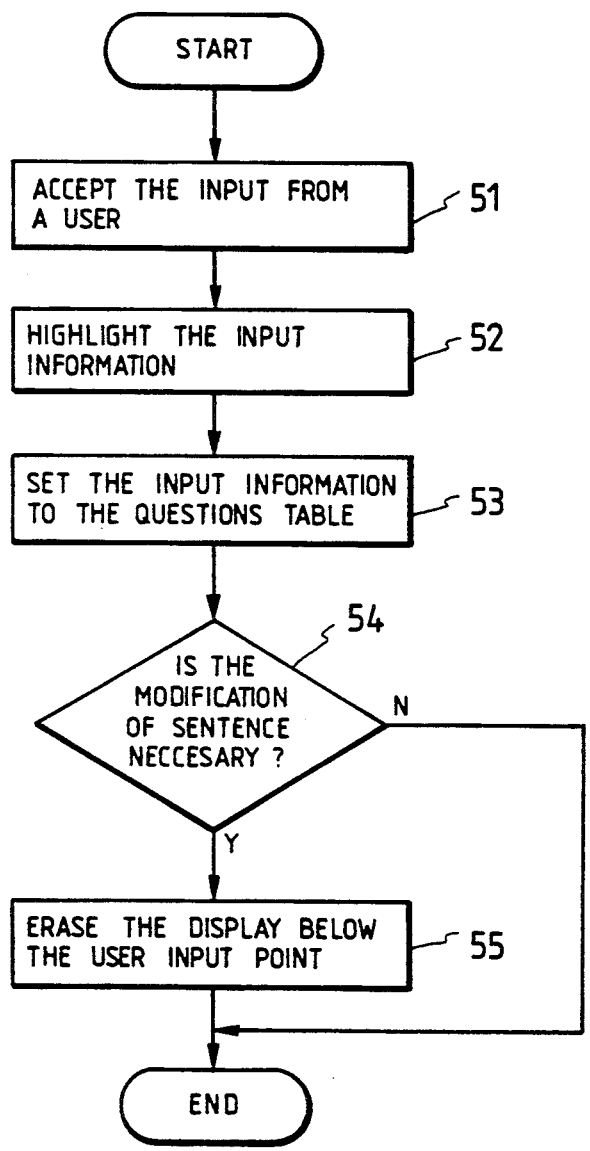

Next, the input program 14 of modifying sentences will be explained with reference to FIG. 35(b). First of all, the input from the client is accepted at the step 51. Then, the input information is highlighted or its color is changed in order to differentiate it from the display of other candidate at the step 52. At the subsequent step 53, the input information is stored in the table 16 of questions. Next, whether or not modification of sentences is necessary by the input is judged at the step 54. If it is not necessary, the processing is complete and if it is necessary, the display of the elements below the user's input point of the inputted question is erased on the screen at the step 55.

If the data representing whether or not modification of sentences is necessary by the input (22 in FIG. 37) is used at the step 54, the processing can be carried out efficiently by erasing the unnecessary portions of questions of the sentence generation rule.

FIGS. 39(a) and (b) show the change of display by the present invention. When the sex "female" is inputted (as represented by arrow) under the state of display as shown in FIG. 39(a), the display of the second rows et seq is changed as shown in FIG. 39(b).

According to this embodiment, the input of information can be made irrelevantly to the sequence so that the input of information can be made on the trial-and-error basis Since the input item is changed in accordance with the content of the input information, the input of unnecessary information can be eliminated.

The embodiment described above represents the case where the unnecessary part of the question of the sentence generation rule is erased by use of the data (22 in FIG. 37) representing whether or not modification of sentences is necessary by the input, and the processing can be carried out efficiently. However, the present invention is not particularly limited thereto. For instance, whether or not sentences must be modified may be incorporated in the processing sequence by a program, or a rule representing whether or not sentences must be modified may be disposed in the sentence generation rule.

In accordance with the present invention that has thus been described in detail, there are provided areas for storing the expertise of the fields of consultation, the client's status, the reply to the client, the intention of the client, the processing know-how and the progress status, respectively, and a suitable reply is selected and offered to the client in correspondence to the client's intention, his level of expertise, and the progressing know-how. Accordingly, the flow of consultation can be adjusted in accordance with the client's intention and reaction and the reply can be given in accordance with the desire of the client.

In an information processing system requiring the input of information such as the consultation system, the system of the present invention generates a sentence or an aggregate of sentences as part of the sentence by the combination of words defining the input items necessary for the execution of processing with the displays representing the input request items and sets values for the input request items of the sentence so as to input the information. Accordingly, the present invention provides the remarkable effects in that an information input system which makes it possible to input the information in irregular order to make once again the input operation.

What is claimed is:

1. In a computer system for consultation comprising a computer having an inference engine and a memory for storing a knowledge base, the improvement wherein:

said knowledge base memory includes a first area for storing expertise in the field of the consultation and a second area for storing processing know-how relating to a processing of the consultation;

said inference engine includes a work memory for storing facts clarified in an inference process, status of a client, intention of the client, a reply to the client and progress status of the consultation;

said first area includes advice rules, each of which has a premise condition part and a reply generation part;

said premise condition part includes statements of the status of the client, the intention of the client, and the progress status of the consultation; and said inference engine comprises means for selecting a reply in accordance with the status of the client, the intention and the progress status, and means for offering the selected reply to the client.

2. The computer system for consultation according to claim 1, wherein said reply generation part includes questions for the client, and said inference engine comprises means for selecting a question from said questions included in said reply generation part in accordance with the status of the intention of the client, and with the progressing status of the consultation.

3. The computer system for consultation according to claim 1, wherein said first area includes definitions of terms in the consultation field, said second area includes processing for explaining a term, and said inference engine includes means for inputting a command for requesting the explanation of one of the terms included in said first area and means for executing said processing for explaining a definition of the one term requested by the inputted command.

4. The computer system for consultation according to claim 1, wherein said first area stores detailed explanation corresponding to the reply, said second area includes processing for explaining in detail the reply, and said inference engine includes means for inputting a command for requesting detailed explanation of the reply and means for executing said processing for explaining the reply in detail by using the detailed explanation stored in said first area, in response to the inputted command.

5. The computer system for consultation according to claim 1, wherein said first area stores an example corresponding to the reply, said second area includes processing for presenting said example to the reply, and said inference engine includes means for inputting a command for requesting the example corresponding to the reply and means for executing said processing for presenting the example stored in the first area in response to said inputted command.

6. The computer system for consultation according to claim 1, wherein said first area includes, hierarchically, the advice rules, said second area includes processing for omitting another reply in accordance with another advice rule which is of the same group as another device rule executed just before, and said inference engine includes means for inputting a command for requesting the switch of topics and means for executing said processing for omitting said another reply in accordance with said another advice rule, in response to said inputted command.

7. The computer system for consultation according to claim 1, wherein said second area includes processing for printing the reply, and said inference engine includes means for inputting a command of requesting printing of the reply and means for executing said processing for printing the reply, in response to the inputted command.

8. The computer system for consultation according to claim 1, wherein said second area includes processing for transferring data between said work memory and an external memory, and said inference engine includes means for executing said processing in order to transfer data from said work memory to said external memory in case that the consultation executed by said inference engine is interrupted and means for executing said processing in order to transfer data from said external memory to said work memory in case that the consultation is re-executed by said inference engine from the consultation progress state at the interruption of consultation.

9. The computer system for consultation according to claim 1, wherein the reply to the client includes a plan having a character string and numeric values obtained by necessary calculation and said first area comprises processing for making the plan, and said inference engine includes means for executing said processing for making the plan.

10. The computer system for consultation according to claim 9, wherein said first area comprises processing for displaying the plan, and said inference engine includes means for executing said processing for displaying the plan.

11. The computer system for consultation according to claim 9, wherein said work memory includes a plurality of plans at different points of progress of the consultation, said second area includes processing for preserving a plan at that time, and processing for retrieving the preserved plan, and said inference engine includes means for inputting a command for requesting a preserved plan and to retrieve the plan and means for executing said processing for either one of preserving and fetching the plan to/from said work memory.

12. The computer system for consultation according to claim 9, wherein
said second area includes processing for displaying an alternative plan preserved by the client together with the plan at that time, and
said inference engine includes means for inputting a command for requesting display of both the alternative plan and the plan at that time.

13. The computer system for consultation according to claim 9, wherein
said first area includes processing for modifying the plan, and
said inference engine includes means for requesting modification of the plan and means for executing said processing for modifying the plan.

14. The computer system for consultation according to claim 1, wherein
said progress status includes a record of an elapsed time from the start of the consultation and a remaining time allowed by the user,
said first area includes the reply and an advice rule according to the reply,
said second area includes processing for adjusting quantity of the reply, and
said inference engine includes means for executing said processing for adjusting the quantity of the reply by using essentially the advice in accordance with the elapsed time and the remaining time.

15. The computer system for consultation according to claim 14, wherein, said inference engine further comprises means for inputting a command for changine the remaining time.

16. The computer system consultation according to claim 1, wherein
said inference engine includes questioning mean for questioning the data necessary for inference and
said questioning means comprises means for displaying a plurality of sentences composed of fixed portions and indefinite portions to be determined by selection from either ones of an arbitrary words and words within a specific range and means for determining said indefinite portions for the result of selection of the words.

17. The computer system for consultation according to claim 16, wherein
said questioning means includes means for outputting to a display device a detailed explanation on each of the sentences and the words on the basis of inputting a command for requesting said detailed explanation.

18. The computer system for consultation according to claim 1, wherein said second area includes processing for seeking an opinion of the client.

19. The computer system for consultation according to claim 1, wherein said knowledge base memory includes an area for storing statements for advertisement.

20. The computer system for consultation according to claim 1, wherein said inference engine further includes means for storing the statements of the advertisement into said area in said knowledge base memory.

21. The computer system for consultation according to claim 1, wherein said inference engine further includes means for collecting consultative content and for storing it in said memory.

* * * * *

UNITED STATES PATENT AND TRADEMARK OFFICE
CERTIFICATE OF CORRECTION

PATENT NO. : 5,006,998

DATED : April 9, 1991

INVENTOR(S) : Chizuko Yasunobu, et al.

It is certified that error appears in the above-identified patent and that said Letters Patent is hereby corrected as shown below:

Claim 7, column 14, line 24, delete "of" and insert therefor --for--.(1st Occur.)

Claim 15, column 15, line 32, delete "changine" and insert therefor --changing--.

Claim 16, column 16, line 1, after "system" insert --for--.

Claim 16, column 16, line 3, delete "mean" and insert therefor --means--.

Signed and Sealed this

Ninth Day of February, 1993

Attest:

STEPHEN G. KUNIN

*Attesting Officer*   Acting Commissioner of Patents and Trademarks